United States Patent [19]
Lukis et al.

[11] Patent Number: 5,661,514
[45] Date of Patent: Aug. 26, 1997

[54] METHOD AND APPARATUS FOR CONTROLLING A THERMAL PRINT HEAD

[75] Inventors: Lawrence J. Lukis, Prior Lake; John M. Gilbert, Minneapolis; Danny J. Vatland, Chanhassen, all of Minn.

[73] Assignee: Lasermaster Corporation, Eden Prairie, Minn.

[21] Appl. No.: 298,936

[22] Filed: Aug. 31, 1994

Related U.S. Application Data

[63] Continuation-in-part of Ser. No. 146,506, Nov. 1, 1993.
[51] Int. Cl.⁶ .................................. B41J 2/35; B41J 2/38
[52] U.S. Cl. ......................... 347/211; 347/185; 347/186
[58] Field of Search .............................. 347/185, 186, 347/211; 400/120.08

[56] References Cited

U.S. PATENT DOCUMENTS

| | | | |
|---|---|---|---|
| 4,262,188 | 4/1981 | Beach | 219/216 |
| 4,268,179 | 5/1981 | Long et al. | 400/120 |
| 4,523,203 | 6/1985 | Adkisson et al. | 346/76 PH |
| 4,524,368 | 6/1985 | Inui et al. | 346/76 PH |
| 4,701,836 | 10/1987 | Horlander | 346/76 PH |
| 4,712,930 | 12/1987 | Maruno et al. | 400/120 |
| 4,779,102 | 10/1988 | Sasaki | 346/76 PH |
| 4,783,667 | 11/1988 | Brooks | 346/76 PH |
| 4,786,917 | 11/1988 | Hauschild et al. | 346/76 PH |
| 4,789,870 | 12/1988 | Lacord et al. | 346/1.1 |
| 4,809,121 | 2/1989 | Nehls | 361/1 |
| 4,847,641 | 7/1989 | Tung | 346/154 |
| 4,859,093 | 8/1989 | Plotnick | 400/120 |
| 4,872,772 | 10/1989 | Tsukamoto | 400/120 |
| 4,887,092 | 12/1989 | Pekruhn et al. | 346/1.1 |
| 5,005,139 | 4/1991 | Tung | 364/519 |
| 5,009,527 | 4/1991 | Yana et al. | 400/120 |
| 5,029,108 | 7/1991 | Lung | 364/519 |
| 5,041,848 | 8/1991 | Gilbert et al. | 346/108 |
| 5,055,943 | 10/1991 | Kishida | 358/459 |

(List continued on next page.)

FOREIGN PATENT DOCUMENTS

| | | |
|---|---|---|
| 0 223 979 A1 | 6/1987 | European Pat. Off. . |
| 56-164160 A | 9/1984 | Japan . |
| 63-39360 | 2/1988 | Japan .................. 347/186 |
| 2-182470 A | 7/1990 | Japan . |

OTHER PUBLICATIONS

Written Opinion for coresponding PCT case US94/11887 filed Oct. 18, 1994.

Stiedel, L., "Technology Overview: Resolution Enhancement Technologies For Laser Printers", LaserMaster Corporation, 1991.

IEE Proceedings–A, "Measurement of Thermal Transients In A Thermal Print Head Used For Dye Diffusion Colour Printing" by P.W. Webb and R.A., Hann, vol. 138, No. 1, Jan. 1991, pp. 98–100.

Electronics and Communications in Japan, "Design of a Thermal Print Head for High–Speed and High–Resolution Printing" by Susumu Shibata and Takashi Kanamori, Part 2, vol. 75, No. 6, 1992, pp. 101–111.

Journal of Imaging Technology, "Dye Diffusion Thermal Transfer (D2T2) Color Printing" by R. A. Hann and N.C. Beck, vol. 16, No. 6, Dec. 1990, pp. 238–241.

Application Notes for Kyocera Thermal Printheads, Revision #5, Aug. 23, pp. 1–25, Kyocera Corporation of Kyoto, Japan.

*Primary Examiner*—Huan H. Tran
*Attorney, Agent, or Firm*—Kinney & Lange

[57] ABSTRACT

A driver circuit provides a plurality of drive energies having a plurality of thermal distributions associated therewith. These thermal distributions interact with print media to form binary images having active and inactive areas. A driver control circuit is responsive to source image information to apply selected drive energies to selected heating elements. These drive energies produce interacting thermal distributions for selectively positioning boundaries between active and inactive areas.

19 Claims, 13 Drawing Sheets

U.S. PATENT DOCUMENTS

| | | | |
|---|---|---|---|
| 5,066,961 | 11/1991 | Yamashita | 346/76 PH |
| 5,075,698 | 12/1991 | Aoki et al. | 346/1.1 |
| 5,081,471 | 1/1992 | Thomas | 346/76 PH |
| 5,089,831 | 2/1992 | Ito et al. | 346/76 PH |
| 5,109,235 | 4/1992 | Sasaki | 346/76 PH |
| 5,122,884 | 6/1992 | Gilbert et al. | 358/298 |
| 5,134,495 | 7/1992 | Frazier et al. | 358/298 |
| 5,142,301 | 8/1992 | Matsumoto | 346/76 PH |
| 5,163,760 | 11/1992 | Nardozzi | 400/120 |
| 5,170,179 | 12/1992 | Chen et al. | 346/76 PH |
| 5,193,008 | 3/1993 | Frazier et al. | 358/298 |
| 5,204,704 | 4/1993 | Genno et al. | 346/76 PH |
| 5,216,440 | 6/1993 | Aoyagi | 346/76 PH |
| 5,235,345 | 8/1993 | Ohno et al. | 346/76 PH |
| 5,248,995 | 9/1993 | Izumi | 346/76 PH |
| 5,264,866 | 11/1993 | Nagahisa | 346/76 PH |
| 5,268,706 | 12/1993 | Sakamoto | 346/76 PH |
| 5,305,024 | 4/1994 | Moriguchi et al. | 346/140 R |
| 5,519,426 | 5/1996 | Lukis et al. | 347/211 |

|   | HEATER A DRIVE TIME (MILLISECONDS) | HEATER B DRIVE TIME (MILLISECONDS) |
|---|---|---|
| 1 | 5.2 | 0 |
| 2 | 7.66 | 0 |
| 3 | 10.75 | 0 |
| 4 | 15.375 | 0 |
| 5 | 20. | 0 |
| 6 | 20. | .35 |
| 7 | 20. | .60 |
| 8 | 20. | .85 |
| 9 | 20. | 1.2 |
| 10 | 20. | 1.55 |
| 11 | 20. | 1.9 |
| 12 | 20. | 2.25 |

|   | EDGE POSITION 1/400 INCH |
|---|---|
| 1 | 0.00 |
| 2 | 0.10 |
| 3 | 0.20 |
| 4 | 0.30 |
| 5 | 0.36 |
| 6 | 0.40 |
| 7 | 0.45 |
| 8 | 0.60 |
| 9 | 0.70 |
| 10 | 0.80 |
| 11 | 0.90 |
| 12 | 0.95 |

150

| | | | | | | | | |
|---|---|---|---|---|---|---|---|---|
| 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 |
| 0<br>0<br>0<br>0 | 0<br>0<br>0<br>0 | 0<br>3<br>9<br>15 | 8<br>15<br>15<br>15 | 15<br>15<br>15<br>15 | 4<br>14<br>15<br>15 | 0<br>0<br>6<br>12 | 0<br>0<br>0<br>0 | 0<br>0<br>0<br>0 |
| 0<br>0<br>0<br>0 | 2<br>6<br>9<br>11 | 15<br>15<br>15<br>15 | 15<br>15<br>15<br>15 | 15<br>15<br>15<br>15 | 15<br>15<br>15<br>15 | 0<br>15<br>15<br>15 | 0<br>3<br>6<br>9 | 0<br>0<br>0<br>0 |
| 0<br>0<br>0<br>0 | 12<br>13<br>14<br>15 | 15<br>15<br>15<br>15 | 15<br>15<br>15<br>15 | 15<br>15<br>15<br>15 | 15<br>15<br>15<br>15 | 15<br>15<br>15<br>15 | 11<br>12<br>13<br>14 | 0<br>0<br>0<br>0 |
| 0<br>0<br>0<br>0 | 15<br>15<br>14<br>13 | 15<br>15<br>15<br>15 | 15<br>15<br>15<br>15 | 15<br>15<br>15<br>15 | 15<br>15<br>15<br>15 | 15<br>15<br>15<br>15 | 15<br>15<br>14<br>13 | 0<br>0<br>0<br>0 |
| 0<br>0<br>0<br>0 | 12<br>11<br>10<br>8 | 15<br>15<br>15<br>15 | 15<br>15<br>15<br>15 | 15<br>15<br>15<br>15 | 15<br>15<br>15<br>15 | 15<br>15<br>15<br>15 | 11<br>10<br>8<br>5 | 0<br>0<br>0<br>0 |
| 0<br>0<br>0<br>0 | 5<br>2<br>0<br>0 | 15<br>15<br>13<br>8 | 15<br>15<br>15<br>15 | 15<br>15<br>15<br>15 | 15<br>15<br>15<br>15 | 3<br>0<br>10<br>5 | 3<br>0<br>0<br>0 | 0<br>0<br>0<br>0 |
| 0<br>0<br>0<br>0 | 0<br>0<br>0<br>0 | 1<br>0<br>0<br>0 | 15<br>6<br>0<br>0 | 15<br>15<br>0<br>0 | 14<br>3<br>0<br>0 | 0<br>0<br>0<br>0 | 0<br>0<br>0<br>0 | 0<br>0<br>0<br>0 |
| 0<br>0 | 0<br>0 | 0<br>0 | 0<br>0 | 0<br>0 | 0<br>0 | 0<br>0 | 0<br>0 | 0<br>0 |

| | | | | | | | | |
|---|---|---|---|---|---|---|---|---|
| 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 |
| 0<br>0<br>0<br>0 | 0<br>0<br>0<br>0 | 0<br>0<br>0<br>0 | 0<br>0<br>0<br>0 | 0<br>0<br>0<br>84 | 0<br>0<br>0<br>0 | 0<br>0<br>0<br>0 | 0<br>0<br>0<br>0 | 0<br>0<br>0<br>0 |
| 0<br>0<br>0<br>0 | 0<br>0<br>32<br>38 | 0<br>56<br>66<br>114 | 114<br>114<br>114<br>84 | 84<br>84<br>84<br>84 | 114<br>114<br>114<br>84 | 0<br>56<br>66<br>114 | 0<br>0<br>0<br>34 | 0<br>0<br>0<br>0 |
| 0<br>0<br>0<br>0 | 46<br>54<br>62<br>66 | 114<br>114<br>114<br>114 | 84<br>84<br>84<br>84 | 84<br>84<br>84<br>84 | 84<br>84<br>84<br>84 | 114<br>114<br>114<br>114 | 40<br>48<br>54<br>58 | 0<br>0<br>0<br>0 |
| 0<br>0<br>0<br>0 | 68<br>68<br>70<br>68 | 114<br>114<br>114<br>114 | 84<br>84<br>84<br>84 | 84<br>84<br>84<br>84 | 84<br>84<br>84<br>84 | 114<br>114<br>114<br>114 | 60<br>62<br>64<br>64 | 0<br>0<br>0<br>0 |
| 0<br>0<br>0<br>0 | 64<br>60<br>54<br>48 | 114<br>114<br>114<br>114 | 84<br>84<br>84<br>84 | 84<br>84<br>84<br>84 | 84<br>84<br>84<br>84 | 114<br>114<br>114<br>114 | 60<br>54<br>50<br>44 | 0<br>0<br>0<br>0 |
| 0<br>0<br>0<br>0 | 40<br>34<br>0<br>0 | 114<br>114<br>108<br>64 | 84<br>84<br>114<br>114 | 84<br>84<br>84<br>84 | 84<br>114<br>114<br>114 | 114<br>108<br>92<br>62 | 34<br>0<br>0<br>0 | 0<br>0<br>0<br>0 |
| 0<br>0<br>0<br>0 | 0<br>0<br>0<br>0 | 52<br>0<br>0<br>0 | 114<br>84<br>0<br>0 | 114<br>114<br>0<br>0 | 84<br>0<br>0<br>0 | 48<br>0<br>0<br>0 | 0<br>0<br>0<br>0 | 0<br>0<br>0<br>0 |
| 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 | 0<br>0<br>0<br>0 |

*Fig. 15*

| 0 0 0 0 | 0 0 0 0 | 0 0 0 0 | 0 0 0 0 | 0 0 0 0 | 0 0 0 0 | 0 0 0 0 | 0 0 0 0 | 0 0 0 0 |
|---|---|---|---|---|---|---|---|---|
| 0 0 0 0 | 0 0 0 0 | 0 0 0 0 | 0 0 0 24 | 0 0 44 71 | 0 0 0 24 | 0 0 0 0 | 0 0 0 0 | 0 0 0 0 |
| 0 0 0 0 | 0 8 5 8 | 12 17 67 66 | 64 63 36 36 | 30 31 46 46 | 64 62 38 38 | 13 18 66 66 | 0 0 4 6 | 0 0 0 0 |
| 0 0 0 0 | 12 15 18 19 | 66 64 63 63 | 37 37 38 38 | 46 46 46 46 | 37 37 37 37 | 65 65 64 64 | 10 12 14 15 | 0 0 0 0 |
| 0 0 0 0 | 19 20 19 17 | 63 63 63 63 | 38 38 38 38 | 46 46 46 46 | 37 38 38 37 | 64 62 62 64 | 16 17 17 15 | 0 0 0 0 |
| 0 0 0 0 | 14 12 9 6 | 64 66 66 66 | 37 37 37 36 | 46 46 46 46 | 37 37 38 38 | 65 65 66 66 | 12 10 8 4 | 0 0 0 0 |
| 0 0 0 0 | 3 0 0 0 | 67 57 17 11 | 36 42 63 59 | 43 37 31 47 | 45 56 64 28 | 56 37 16 14 | 0 0 0 0 | 0 0 0 0 |
| 0 0 0 0 | 0 0 0 0 | 0 0 0 0 | 23 0 0 0 | 77 0 0 0 | 0 0 0 0 | 0 0 0 0 | 0 0 0 0 | 0 0 0 0 |
| 0 0 0 0 | 0 0 0 0 | 0 0 0 0 | 0 0 0 0 | 0 0 0 0 | 0 0 0 0 | 0 0 0 0 | 0 0 0 0 | 0 0 0 0 |

*Fig. 16*

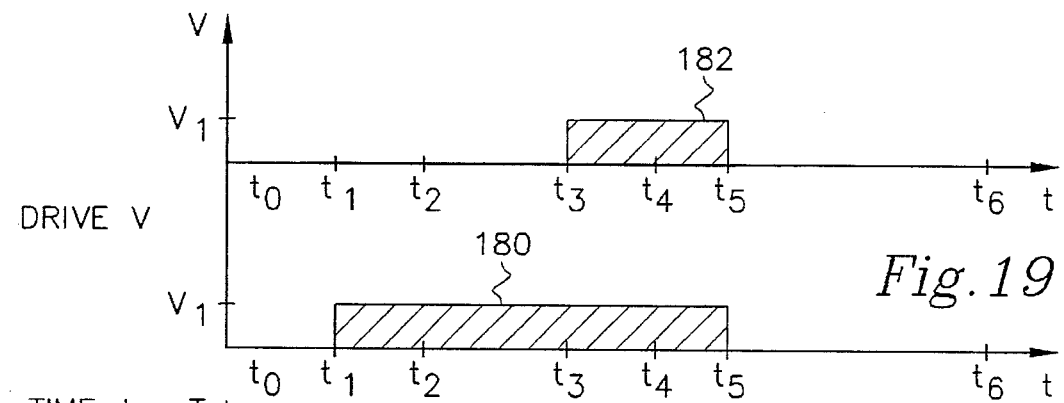
Fig. 19
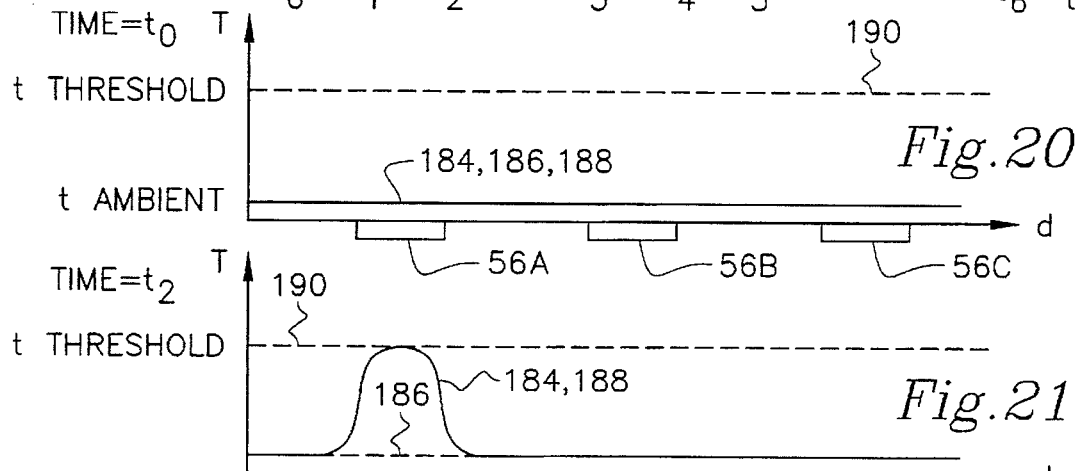
Fig. 20
Fig. 21
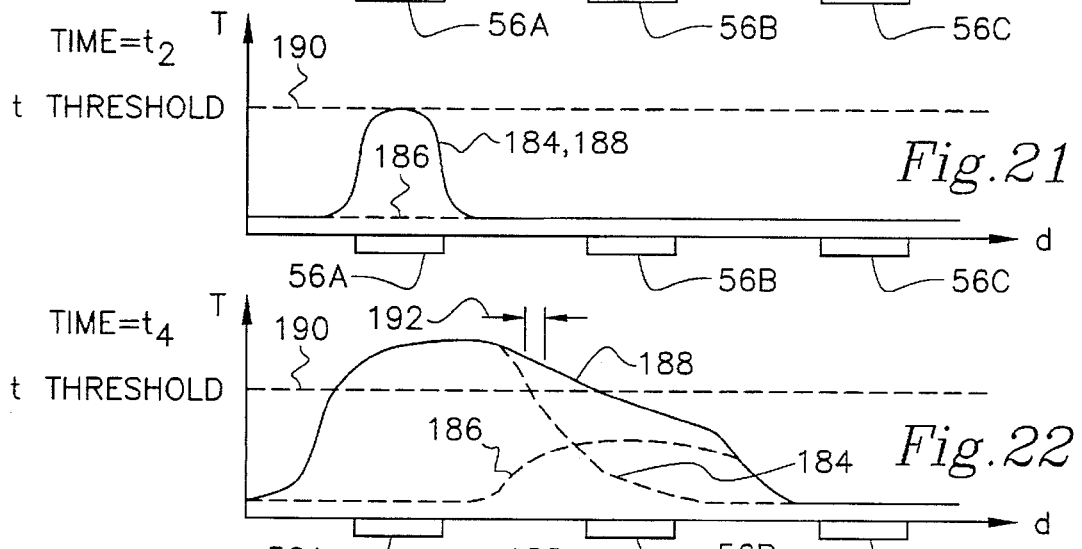
Fig. 22
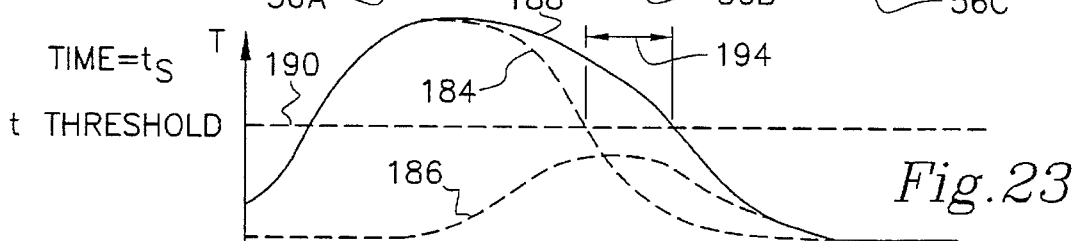
Fig. 23
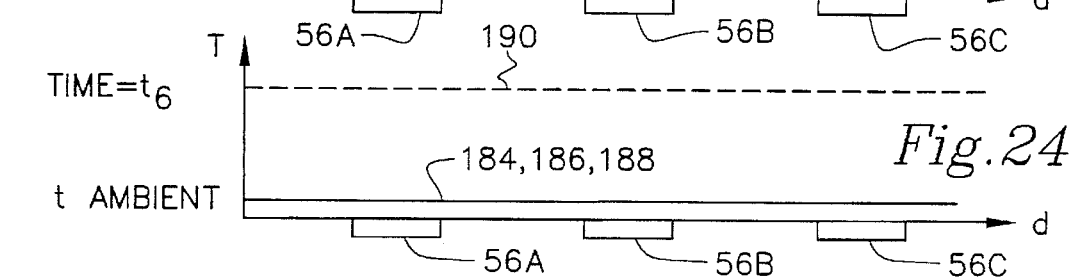
Fig. 24

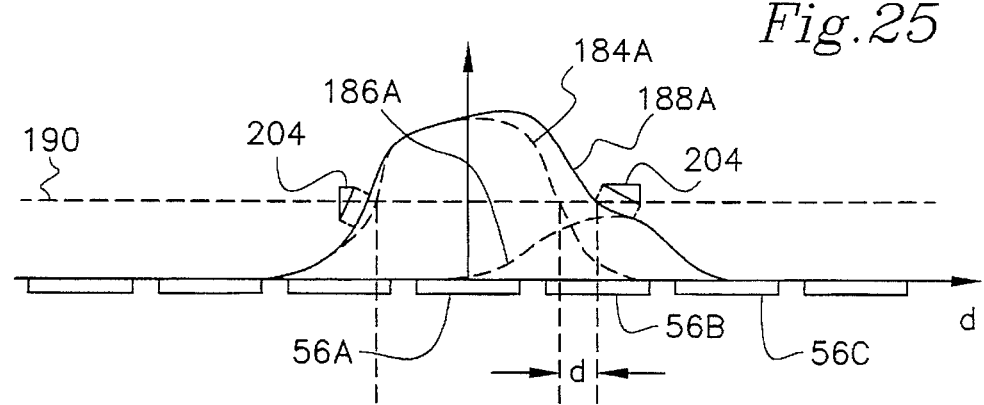
Fig.25
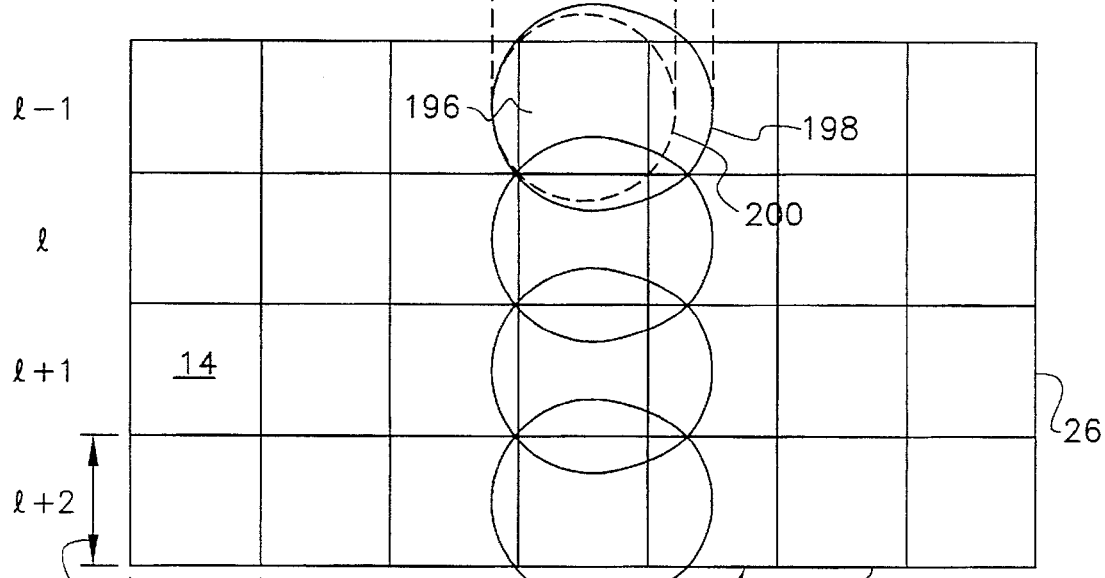
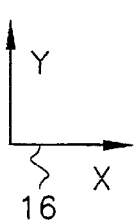
Fig.26

METHOD AND APPARATUS FOR CONTROLLING A THERMAL PRINT HEAD

CROSS-REFERENCES TO RELATED APPLICATION

This application is a continuation-in-part of an application entitled METHOD FOR CONTROLLING A THERMAL PRINTER TO INCREASE RESOLUTION, Ser. No. 08/146,506, filed Nov. 1, 1993.

BACKGROUND OF THE INVENTION

The present invention relates to a method and apparatus for controlling thermal printers, preferably to form binary images. More particularly, the present invention relates to a method and apparatus for selectively positioning boundaries between active and inactive areas of an image.

Thermal printing is generally accomplished by incrementally moving or "stepping" a print media in a y-direction relative to a stationary thermal print head. Thermal print heads generally include a plurality of heating elements which are frequently arranged in a linear array in an x-direction perpendicular to the direction of print media movement. The step size is often chosen to be equal to x-direction spacing or "pitch" between heating elements. For example, printers with 300 dot per inch (dpi) thermal print heads (i.e., one having a pitch of 1/300th of an inch) frequently step the print media past the thermal head at 1/300th of an inch intervals. The 1/300th×1/300th square inch area covered by a dot from a heating element is generally referred to as a picture element, or "pixel".

The heating elements are generally resistive elements each driven with a separate current flowing therethrough. A print controller selectively controls the respective heating element currents to activate the heating elements as desired during each advance of the print media. Different heating elements may be selectively activated for each step of the printing media, forming a two-dimensional image on print media.

The heating elements cooperate either directly to a thermally responsive printing media, or indirectly through donor media onto ordinary printing media. In the first case, referred to as "direct thermal printing", the printing media changes color in selective locations corresponding to the selectively energized heating elements. In the second case, referred to as "donor printing" or "thermal transfer priming", selective heated locations of the donor media transfer color to the printing media. The donor media may be a ribbon coated with a wax or ink which melts due to the heat of the heating elements.

There is a continual desire for thermal printers that provide clearer, more uniform and more consistent output images. Generally this desire has been addressed by reducing the spacing between the heating elements. However, the size of the heating elements and the distance between the heating elements is limited by present design and manufacturing considerations. Usually each heating element must be independently wired to a driver device which provides electrical drive energy to the heating element. As heating element spacing gets smaller, placement of these structures becomes more difficult and expensive. In addition, thermal printers should have relatively modest processor and memory requirements. In general, the greater the processor and memory requirements, the greater the cost of the thermal printing device.

SUMMARY OF THE INVENTION

The present invention is a method and apparatus for controlling a thermal print head for providing binary images having improved effective resolution for features greater than a minimum feature size. The thermal print head controller receives source image information and provides drive energy levels to a thermal print head having a plurality of heating elements. The heating elements generate images on print media having active and inactive areas. The thermal print head controller provides a plurality of drive energies, each having a thermal distribution associated therewith. Interaction between adjacent thermal distributions is used to selectively position boundaries between active and inactive areas.

Another aspect of the present invention is that timing of drive energy application to selected heating elements is selectively controlled to produce beneficial interaction of thermal distributions thereby selectively positioning active area boundaries.

BRIEF DESCRIPTION OF THE DRAWINGS

FIG. 14 is an array of frame buffer values for specifying the source image data for the circular active area.

FIG. 15 represents an array of temperature values formed from the array of frame buffer values shown in FIG. 14 using the method and apparatus of the present invention.

FIG. 16 shows an array of heating element drive values formed from the array of temperature values shown in FIG. 15 using the method and apparatus of the present invention.

FIG. 19 is a graphic representation of neighboring drive pulses in accordance with the present invention.

FIGS. 20–25 show thermal distributions in response to the drive pulses of FIG. 19.

FIG. 26 shows four vertically aligned dots placed on the print media by repeating the drive pulses of FIG. 19 at four locations.

DETAILED DESCRIPTION OF THE PREFERRED EMBODIMENTS

Figure 1:
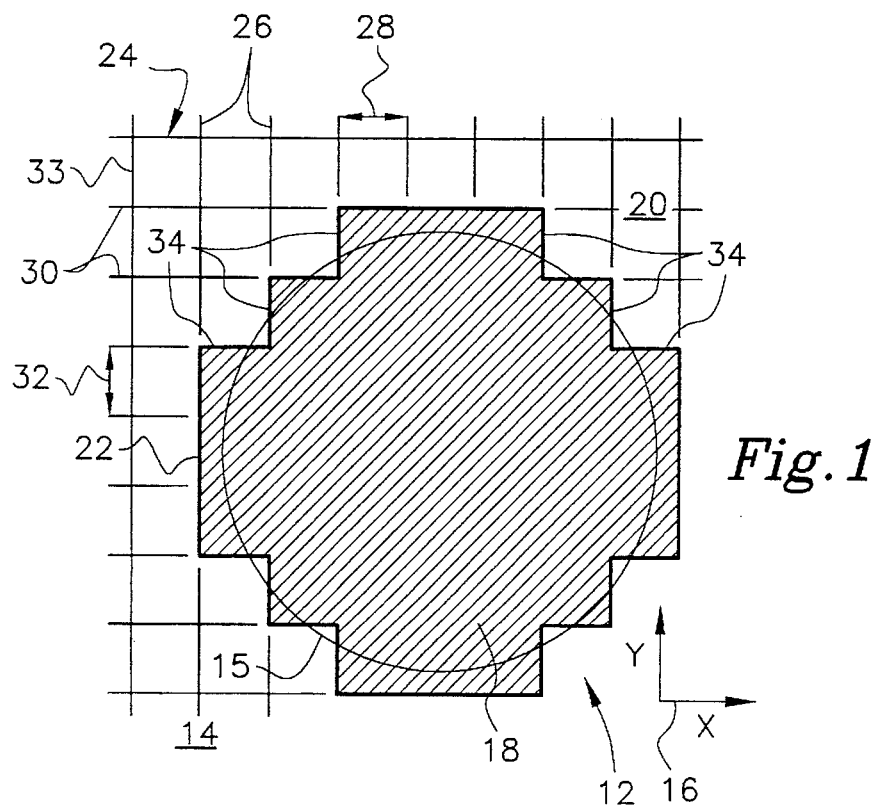
FIG. 1 shows an image printed from an ideally circular source image in accordance with the prior art.

Before discussing the apparatus and method of the present invention, it will be helpful to first define several terms related to the thermal printing process.

Thermal printing occurs due to the application of heat to a thermally responsive media. For direct printing, thermally responsive printing media can be generally thought of as changing color or becoming "active" if the temperature at any given location exceeds some threshold temperature for any duration of time. Similarly for donor printing, the donor media generally transfers color if its temperature at any given location exceeds some threshold temperature for any duration of time. It is recognized that different thermally responsive printing media may have very different threshold temperatures, as may different donor media. The color change is most often to place black images on a white or transparent print media, but thermal printing is regularly used for transferring other colors as well.

Once the threshold temperature is reached, it is believed that the heat flow and/or time required for coloring to occur is negligible. Different print and/or donor media may require different amounts of heat energy to drive the color transfer, or may require different amounts of time to drive the color transfer. The present invention is applicable to thermal printers regardless of whether the color change is driven by a threshold temperature, by a threshold heat, by a threshold time, or by a combination thereof, and it is not necessary to completely understand the thermal coloring and heat transfer characteristics of the media to utilize the present invention.

In addition to the color change occurring at a threshold temperature, damage will occur to the printing media or the donor media if excessive heat or temperature is applied. Accordingly, there is a damage temperature which should not be exceeded during the printing process. Similar to the color change, damage to the printing media may be temperature, heat or time dependent or may be dependent on combinations thereof. The present invention is applicable to thermal printing with any of these damage modes.

Thermal printing can also be characterized by type of image generated. Binary printing occurs where every location on the image is one of two colors. There are no tones or shades of color in binary printing. Areas where coloring occurs are referred to as active areas, and areas where no coloring occurs are referred to as inactive areas. Binary printing is often used for text and line art images. Continuous tone or contone images which are made up of various tones or shades of color are often printed on binary printing devices by utilizing halftone techniques. These halftone techniques typically utilize a series of halftone cells to render the source image information. By altering the proportion of colored and non-colored areas within the halftone cell, the viewer perceives different tones of color, even though the image is binary in nature when viewed more closely. Thermal printers may also be used to generate contone images by varying the optical density of the media.

In modeling the color change to occur at a threshold temperature, it is useful to look at "thermal distributions" of various heating elements, independent of time and of heat applied. Thermal distributions are graphical representations of the maximum temperatures at given x-y locations on the media during the printing process, regardless of when in time the maximum temperature at each particular x-y location is attained. If the thermal distribution curve is above the threshold temperature plane at a particular x-y location, then coloring of that location is achieved. If the thermal distribution curve does not cross the threshold temperature, the location will not be colored.

The absolute or physical resolution of a printer is the size of the smallest marking or "feature" which the printer can generate and accurately position. Each of the heating elements generally place a "dot" on the image, and it has generally been desired that all the dots be uniform. The absolute resolution of a thermal printer in the x-direction is based on the "pitch" or distance between adjacent heating elements. Although thermal printers may generate a mark smaller than the pitch, these printers cannot position these small marks in the x-direction more accurately than the pitch. In addition, thermal printers cannot position more than one dot in between adjacent heating elements. The absolute resolution in the y-direction is based on the dimension of the heating elements in the y-direction and the step size. In both directions, the absolute resolution is also based on the thermal transfer characteristics from the print head to the media. In all cases the printing media must be able to support the resolution of the printer in order for the printed image to reflect the resolution of the printer.

Printers may also have apparent or effective resolutions which are different from the absolute resolution, if boundaries between active and inactive areas can be controlled to a degree higher than the absolute resolutions. By choosing a step which is smaller than the absolute y-resolution of the print head, the apparent resolution in the y-direction can be enhanced. For instance, if the printer is stepped at four steps per pixel, the apparent resolution in the y-direction will be four times the absolute resolution. Even though a mark cannot be generated and accurately positioned to a location smaller than one pixel, the y-direction boundary between active and inactive areas (i.e., the boundary between adjacent y-locations) can be placed within a quarter of a pixel. Accordingly, for active areas of a size equal to or greater than one pixel in the y-direction, y-direction boundaries can be positioned with an accuracy of a quarter of a pixel. Until the present invention, it has not been possible to achieve apparent or effective resolution in the x-direction which is greater than the absolute resolution due to the physical constraints of the print head.

The fidelity of a printed image is how closely the printed image or output image matches the source image information provided to the printer. Often the source information provided will perfectly describe the desired output image, such as for text commands generated by a computer. The printer may then "render" or "quantize" the ideal source image information to a grid-like mapping. The size of the grid is usually chosen to be equivalent to the effective resolution of the printer. Alternatively, the source image information may already be in the form of a grid-like mapping prior to being provided to the printer, in which case the ideal source image may not be exactly known. Various techniques exist for improving the quality of source image information if the ideal source image is not exactly known. In any case, the rendering process can be thought of as specifying areas on a grid of finite size. This grid usually represents the effective resolution of the printing device.

For binary images, each location on the grid is defined as either completely colored or completely uncolored. In discussing data manipulation herein, it is assumed that the source image information is rendered to the degree necessary to support the effective resolution of the printer.

The visual acuity of a printed image is the sharpness of image as perceived by a viewer. Because of the way the human eye receives and averages light from different locations on an image, visual acuity does not necessarily correspond with the resolution of an output image.

FIG. 1 shows an output image 12 formed by a conventional thermal print head on media 14. The outline of an ideal source image 15 is shown overlaid on the output image 12 for purposes of comparison. The ideal source image 15 represents a perfect circle such as found in a punctuation mark period. In other shapes, the source image could represent any portion of an image without limitation, and particularly any text or line art image. Directional reference 16 shows the x-direction of the heater element array and the y-direction of media 14 travel relative to the print head.

The output image 12 contains an active portion 18 and an inactive portion 20, and a boundary 22 therebetween. An imaginary pixel grid 24 is shown adjacent the output image 12. Vertical lines 26 in the imaginary grid 24 represent the spacing or pitch 28 between heater elements. Horizontal lines 30 in the imaginary grid 24 represent the step size 32 for moving the media 14 relative to the print head. The active portion 18 is made up of a series of dots or marks formed by individual heating elements, with each dot roughly filling a grid-square 33. This output image 12 is a binary image, with the active area 18 being fully shaded.

Boundary 22 includes stairsteps or jaggies 34. Jaggies 34 occur due to the resolution of the printer. As evidenced by jaggies 34, the conventional thermal printer has the same resolution in both vertical and horizontal directions, and effective resolution is equal to absolute resolution. Jaggies 34 represent poor fidelity of the output image 12 to the source image 15 in contrast to the smoothly curved circular outline of the ideal source image 15. Jaggies 34 also cause poor visual acuity when FIG. 1 is viewed from a distance. The way the prior art thermal print head is utilized limits the thermal printer from more closely approximating the curvature of the ideal source image 14.

Figure 2:
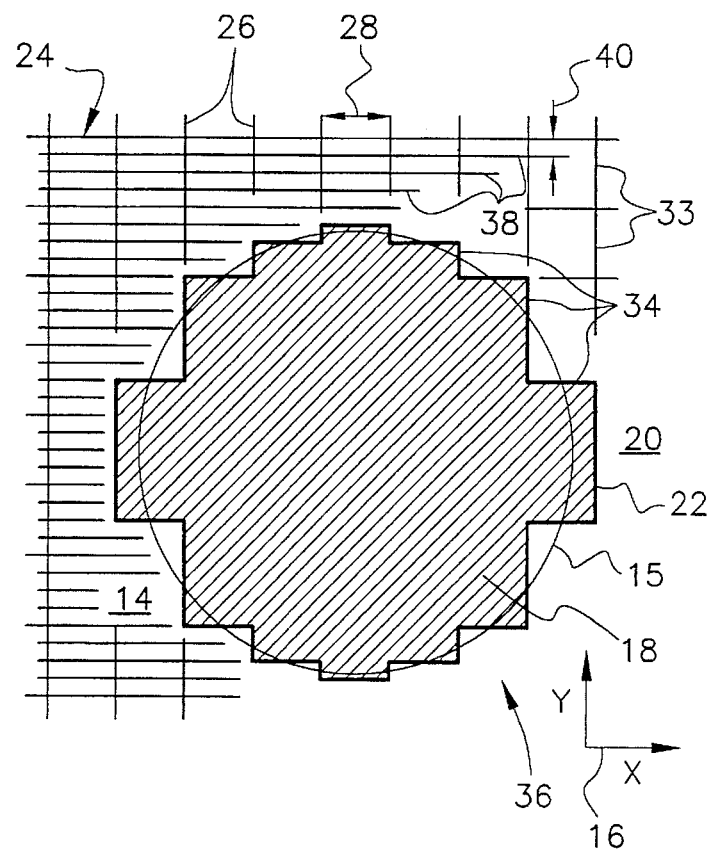
FIG. 2 shows an image printed from the ideally circular source image with a stepping rate four times the pitch.

FIG. 2 shows an output image 36 formed by the same conventional thermal print head and based on the same ideal source image 14. As shown by horizontal lines 38, the step size 40 used in printing output image 36 is one-quarter the step size 32 used for printing the output image 12 of FIG. 1. The reduced step size 40 increases the y-direction effective resolution of output image 36, as y-direction portions of boundary 22 can be placed at any of four locations for each grid-square 33. Jaggies 34 which are associated with vertical edges are the same as in FIG. 1. However, jaggies 34 which are associated with horizontal edges are smaller than the jaggies 34 of FIG. 1. While this results in a significant improvement for near-horizontal edges, there is little or no improvement in near-vertical edges, and the overall fidelity and visual acuity of output image 36 is only slightly increased.

In processing the image 36 with this reduced step size 40, locations within active area 18 are heated and cooled through four heating cycles. With the threshold temperature and damage temperature model described above, it is presumed that this multiple thermal cycling will not affect the quality of active area 18.

Figure 3:
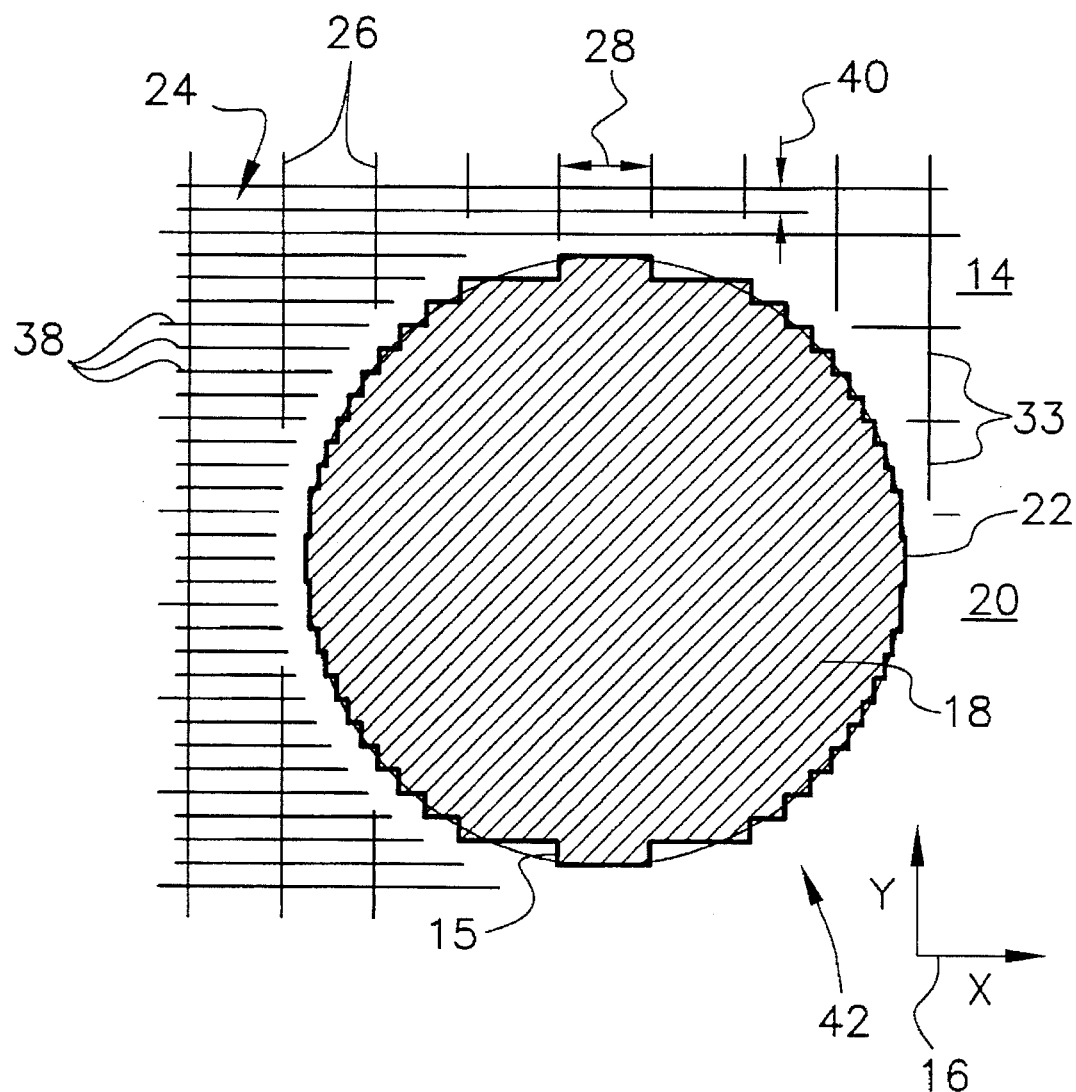
FIG. 3 shows an image printed from the ideally circular source image using the present invention.

FIG. 3 shows an output image 42 formed by the same conventional thermal printer, based on the same ideal source image 14, and using the same step size 40 as in FIG. 2. However, output image 42 has been printed in accordance with the neighbor effect of the present invention, as will be described. As can be seen, output image 42 shows great enhancement of effective resolution. A viewer recognizes a sharp uniform edge to the active area rather then the jaggies 34 of the prior art, and the visual acuity of output image 42 is much greater than that of the prior art image 12 shown in FIG. 1. The fidelity of the image 42 to the original perfectly circular source image 14 is also very high.

In each of these FIGS. 1–3, boundary 22 is the outside extent of the series of dots printed. The corners of boundary 22 are shown relatively square, so as to more clearly illustrate the effects of x and y resolution on the overall image. The corners actually produced will correspond to the shape of the individual dots produced by the print head, and may be more rounded than shown in FIGS. 1–3.

Figure 4:
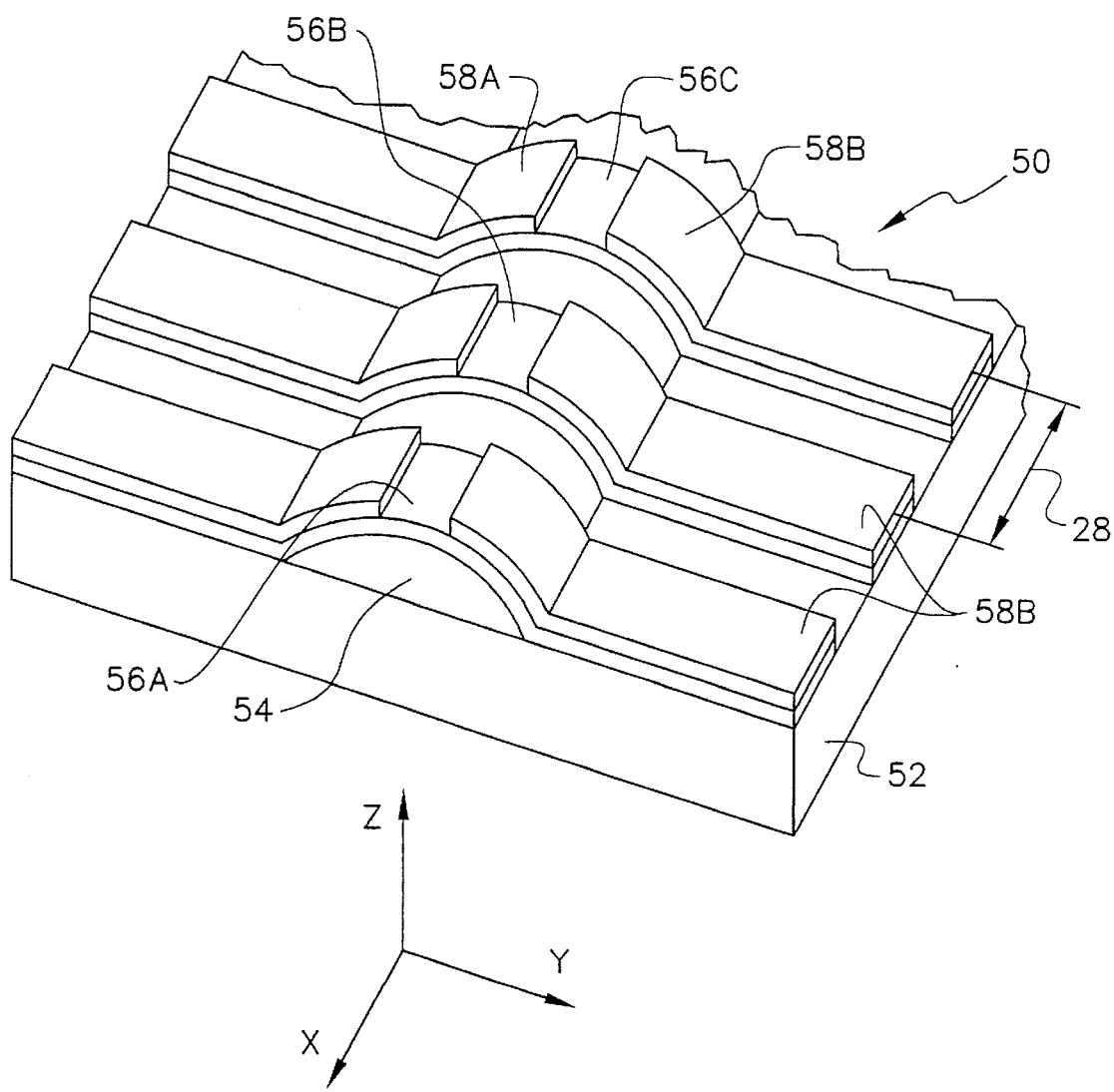
FIG. 4 is a perspective view of a portion of a typical thermal print head having a plurality of heater elements.

A greatly enlarged representative view of a portion of a thermal print head 50 is shown in FIG. 4. FIG. 4 is drawn out of scale, particularly as to the thickness and size of various layers, to better contrast the various elements. The thermal print head 50 or other types of thermal print heads may be found in various thermal printers. Thermal print head 50 is particularly contemplated for use with the thermal printer described in co-pending application Ser. No. 08/285,059 for HIGH RESOLUTION COMBINATION DONOR/DIRECT THERMAL PRINTER by Leonard et al., which is assigned to the assignee of the present invention and incorporated herein by reference.

The thermal print head 50 is formed on a conventional substrate 52 such as alumina or ceramic. A glaze layer 54 is positioned on substrate 52 with resistive heater elements 56 positioned on the glaze layer 54. An electrical conductor layer 58 is then positioned on each heater element 56 to complete a separate electrical circuit through each heater element 56. The conductor layer 58 is a conventional electrical conductor used in thin or thick film processing such as gold. Heater elements 56 are conventional thin fill or thick film resistors. The pitch 28 between adjacent heater elements 56a, 56b, 56c in the preferred embodiment print head is 1/600th of an inch (i.e., 600 dpi). The heater elements 56 are generally square, and generally produce a dot on the media 14 which fills a 1/600th×1/600th of an inch grid-square 33.

It is recognized that other types of thermal print heads exist which differ from that shown in FIG. 4. The size, shape and orientation of all the various components shown may be altered as desired by workers skilled in the art. A glaze may be placed over the entire line of heater elements 56. The heater elements 56 may not be linearly arranged, but rather may have some y-offset between adjacent heater elements 56a, 56b, 56c. The array of heater elements 56 may be disposed at an angle to the direction of media 14 movement. The thermal print head 50 may be moved in a y-direction relative to stationary print media 14. Either the thermal print head or the print media 14 may also be moved in an x direction in between steps of print media 14, so as to create a non-rectangular output pattern. Other modifications may be made to the thermal print head 50. The present invention applies to all thermal print heads, regardless of shape, pitch, thermal characteristics or configuration.

The thin film thermal print head 50 can be modeled as several different first order systems, each having a different thermal time constant. The thermal time constant is the time required to reach approximately 63% of a final temperature increase in response to a step input across a heater element 56. The head mount that is attached to the substrate 52, with its thermal capacity and its heat dispersive effects to the atmosphere, has a thermal time constant on the order of several minutes. The substrate 52 itself has a thermal time constant on the order of several seconds. Finally, the heating elements 56 have a thermal time constant on the order of one millisecond. Thermal analysis of thin film thermal print heads is discussed in an article entitled "Design of Thermal Print Head or High Speed and High Resolution Printing" by S. Shibata and T. Kanamori published in Electronics and Communications in Japan, Part II, Volume 75, No. 6, 1992.

The thermal response of print head 50 is generally as follows. At the beginning of a heating cycle, the entire head 50 is generally at a uniform, ambient temperature. A voltage is applied across heater element 56 between conductors 58a and 58b, generating heat within heater element 56. The thermal capacity of heater element 56 relative to the thermal energy applied is very small, and thus the temperature of heater element 56 increases substantially and quickly (i.e., on the order of 50° C. in one millisecond in response to the voltage applied in the preferred system). As the temperature of heater element 56 increases, thermal heat transfer occurs out of element 56 in all directions, through conductors 58, through glaze 54, along resistive layer 56, and, most importantly in a z-direction out of heater element 56.

When print head 50 is printing, the media (not shown in FIG. 4) is held in contact with each of the heater elements 56a, 56b and 56c by a biasing means such as an elastomeric platen. Heat transfers out of an energized resistive element 56 in a positive z-direction, into the printing media opposite heater element 56. Heat may also be transferred from adjacent locations on conductive layers 58, as well as between adjacent heater elements 56a, 56b, 56c. Heat transfer within the media may occur in both x- and y- directions, as well as in a z-direction. Z-direction transfer within the media may be important when using donor media to drive the wax or ink transfer from the donor media to the opposed print media. Regardless of the particular heat transfer mode employed, the properly configured system will have the heat generated from heater elements 56 transferred into the print media thereby forming corresponding dots or marks on printing media.

Because the thermal time constants of the heat dispersive effects to the atmosphere and the substrate 52 are very large relative to the dispersive effects from the elements 56 and from the media, the atmosphere and substrate 52 can be modeled as constant ambient temperature heat sinks when modeling the transient behavior of the print head 50. However, particularly during a heating cycle, glaze layer 54 and other portions of print head 50 immediately adjacent a heating element 56 do not act as ambient temperature heat sinks. Thermal interaction occurs in all directions, including x-direction heat transfer between heating elements 56a, 56b, 56c and between corresponding x-locations on the print media. The particular characteristics of this thermal interaction is dependent on the physical characteristics of the device and media. In general, the exact thermal interaction will be different for devices having different physical characteristics and using different media, but will always occur to some degree. The present invention utilizes thermal interaction between heating elements in contrast to prior art devices which attempt to eliminate or compensate for the thermal interactions. In contrast to prior art devices, the present invention recognizes and utilizes this thermal interaction.

Figure 5:
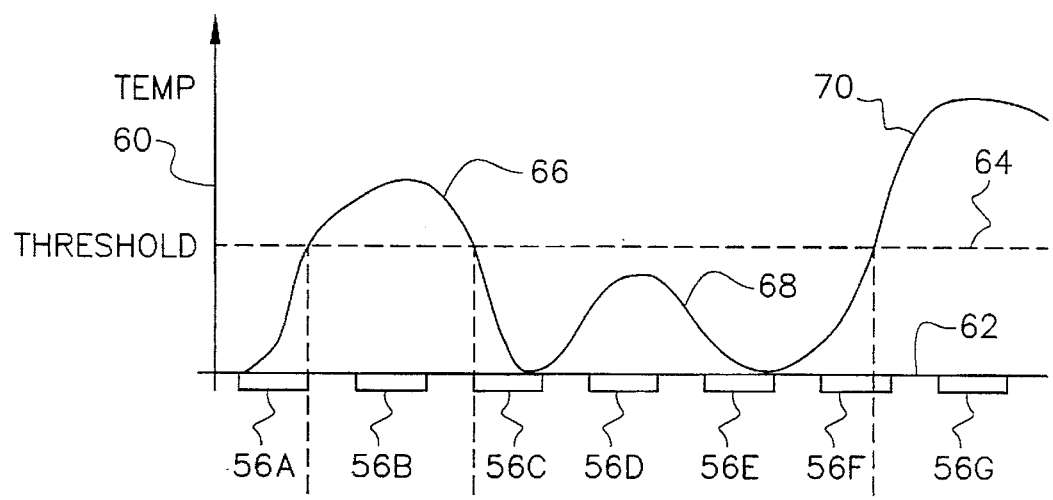
FIGS. 5, 6 and 7 show thermal distributions, resulting binary images and the three different heater element drive pulses forming them, respectively.
Figure 6:
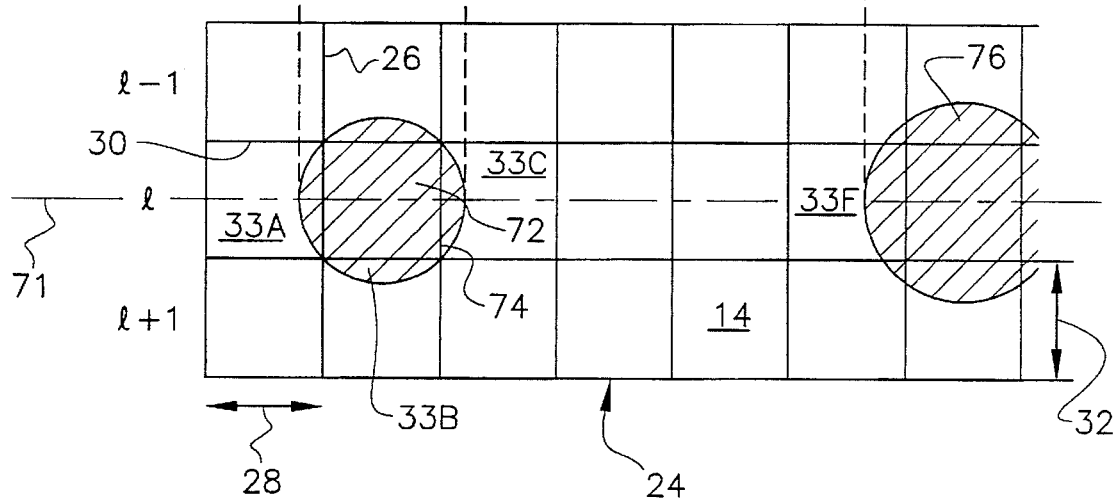
Figure 7:
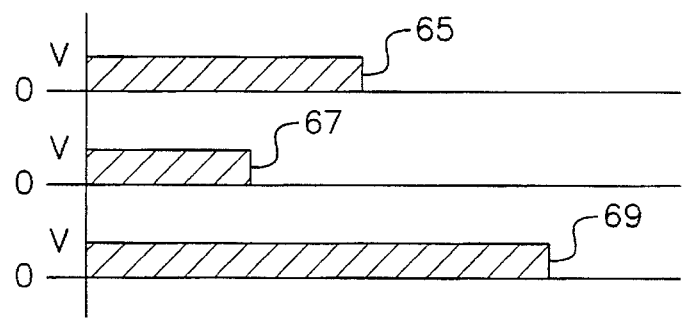

FIG. 5 shows three thermal distributions 66, 68 and 70 formed by three drive pulses 65, 67 and 69 of FIG. 7. Drive pulses 65, 67 and 69 have different energies as evidenced by their different durations, and are applied to heater elements 56b, 56d and 56g respectively. FIG. 6 shows binary images formed on thermally responsive media 14 by the application of three drive energies 65, 67 and 69.

The y-axis 60 of FIG. 5 represents temperature of the thermally responsive media 14, and the x-axis 62 represents distance in the x-direction along media 14. Heater elements 56a–g are schematically shown in their respective x-locations, and thermal distributions 66, 68 and 70 are taken along a centerline 71 of heating elements 56 for print line L. A threshold temperature 64 represents a temperature plane above which the media 14 becomes active.

Curves 66, 68, and 70 are theoretical representations of thermal distributions from heater elements 56b, 56d, and 56g, respectively, during the heating cycle for line L. In the case where the thermal head 50 cooperates directly with a print media such as thermal sensitive paper, a location along centerline 71 of the media 24 of FIG. 6 changes color if the peak temperature at that location exceeds the threshold temperature 64. For the case where the thermal print head 50 cooperates indirectly with a print media such as in thermal wax transfer printing, the thermal head 50 is used to transfer pigment or wax from a transfer or donor media such as a color ribbon onto the print media. Pigment is transferred if a location on the donor media reaches the threshold temperature 64. The color of the active area is dependent on the color of the pigment. Frequently, the pigment is cyan, yellow, magenta, or black (CYMK).

FIG. 6 shows print media 14 with superimposed imaginary grid 24. The print media 14 shown represents a current print line, designated L, a previous print row or line designated L−1 and the next print line designated L+1. The current print line L is produced by activating the thermal print head 50 to form the thermal distributions 66, 68 and 70 shown in FIG. 5.

Heat from heater element 56b produces active portion 72. Active portion 72 has a boundary 74 that corresponds to the intersection of the threshold temperature 64 and the thermal distribution 66. Active portion 72 represents one "dot" of an image. Active portion 72 is large enough to entirely cover a gridsquare 33b, and extends a limited amount (approximately 10 to 20%) into adjacent grid-squares 33a, 33c. With this size dot, multiple active portions provide uniform coverage without gaps when adjacent pixels are active. With prior art printers, it is generally preferred that activated heater elements uniformly produce dots of this size.

The thermal distribution 68 never reaches the threshold temperature 64, and therefore heat from heater element 56d does not produce a corresponding active portion.

By energizing heater element 56g for a longer duration than heater element 56b, heater element 56g produces active portion 76. Active portion 76 has a boundary 78 that corresponds to the intersection of the threshold temperature 64 and the thermal distribution 70. Active portion 76 is larger than active portion 72, and boundary 78 extends considerably (approximately 30 to 40%) into adjacent grid-square 33f. In contrast to prior art devices, the present invention utilizes the selective placement of active area boundaries based on selected drive energies of heater elements. The active portions 72 and 76 illustrate that varying sized active portions can be formed by the application of different drive energies, each of which form a corresponding thermal distribution that exceeds the threshold 64.

Active portions 72 and 76 are depicted as being circular. The shape of these active portions will be somewhat dependent upon the shape of heating elements 56, and may vary for various printers. Imaginary grid squares 33 are depicted as squares to represent the typical extent of a single active area 72 for full coverage of grid square 33b on the media 14. For other shapes of active areas, the imaginary grid 24 chosen may be made up of rectangles, triangles, or other shapes which effectively represent the extent of a typical active area.

Much of the prior art has attempted to improve the quality of the output image by ensuring that the dot size is uniform and consistent. In general, a number of factors may be compensated for to provide more consistent dot size, such as residual heat from previous heating cycles. In contrast, the present invention forms dots of non-uniform size to form active areas which more closely conform with an ideal source image or otherwise provide better output. In the preferred embodiment, dots or active portions are selectively extended in the x direction by the selective application of drive energy to an adjacent heating element.

Controlling or positioning boundaries between active and inactive areas in the x direction provides an apparent or effective increase in resolution in this direction. Because an active area can be grown or formed which extends a selected amount in the x-direction by applying heat to an adjacent heating element, the effective resolution in the x-direction is limited only by one's ability to control drive energies applied to both a heating element and its adjacent heating element. Although active portions can selectively be extended in the x direction, there is still a minimum size active area that can be formed and accurately positioned, and thus there is no increase in absolute resolution of the print head.

Figures 8, 9, 10:
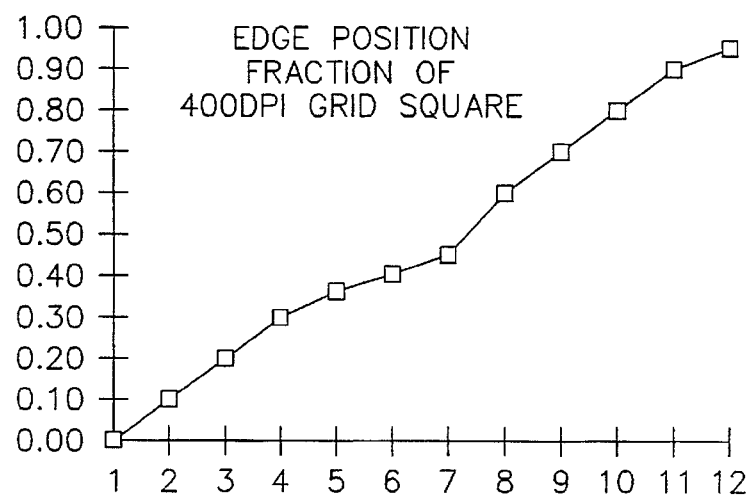
FIGS. 8, 9 and 10 show boundary growth as a function of drive time on heater element A and a neighboring heater element B.

FIGS. 8 and 9 represent test data taken when utilizing the active area growth method of the present invention. FIG. 8 shows drive times for adjacent heater elements A and B of a 400 dpi thermal head model number KWT-601-16MPJ8 manufactured by Kyocera Corporation of Kyoto, Japan. The drive voltage applied to the heater elements was 15.5 volts instead of 24 volts which is the normal drive voltage. The reduced drive voltage requires a longer drive pulse duration for a given drive energy to promote thermal interaction between heating elements. The effects of drive pulse duration on thermal interaction will be discussed in more detail latter. Based on the drive times of FIG. 8, FIG. 9 shows the corresponding placement of the active area boundary within the adjacent grid-square, given as a ratio to the total width of the adjacent grid-square. FIG. 10 graphically shows the data in FIG. 9. Twelve different data points are shown, which allow selective positioning of the boundary ranging from the beginning to the opposite edge of the adjacent grid-square.

As can be seen from reviewing this data, the first heater element had to be driven 5.2 milliseconds before its active area boundary reached the adjacent grid-square. As drive on heater element A is increased from 5.2 to 20 milliseconds, the boundary selectively swells through positions 1–5 to approximately 36% of the way into grid-square B. Driving heater element A for periods of time in excess of 20 milliseconds tends to damage the media. At the dot size and duration of drive time of position 5, it is believed that the thermal distribution from heater element A has reached a maximum practical limit.

While increased drive energy applied to heater element A cannot extend the boundary without damaging the media, the boundary can be further extended into grid-square B without damaging the media by applying energy to heater element B. After heater element A has been driven for 20 milliseconds, applying drive energy to heater element B from 0.35 milliseconds through 2.25 milliseconds extends the boundary from positions 6–12, through 95% of the way across grid-square B. Note that this application of energy to heater element B does not produce its own dot, but rather extends the active area generated by heater element A. It is believed that both heater elements make a contribution to the overall thermal distribution, and this thermal interaction allows the selective boundary growth observed.

By using this method, the boundary can be selectively positioned as desired within the adjacent neighbor grid-square. Selective positioning of the boundary allows considerable improvement of the effective horizontal resolution of the resulting binary image. Visual acuity and fidelity of the output image to the source image can be greatly enhanced.

Figure 11:
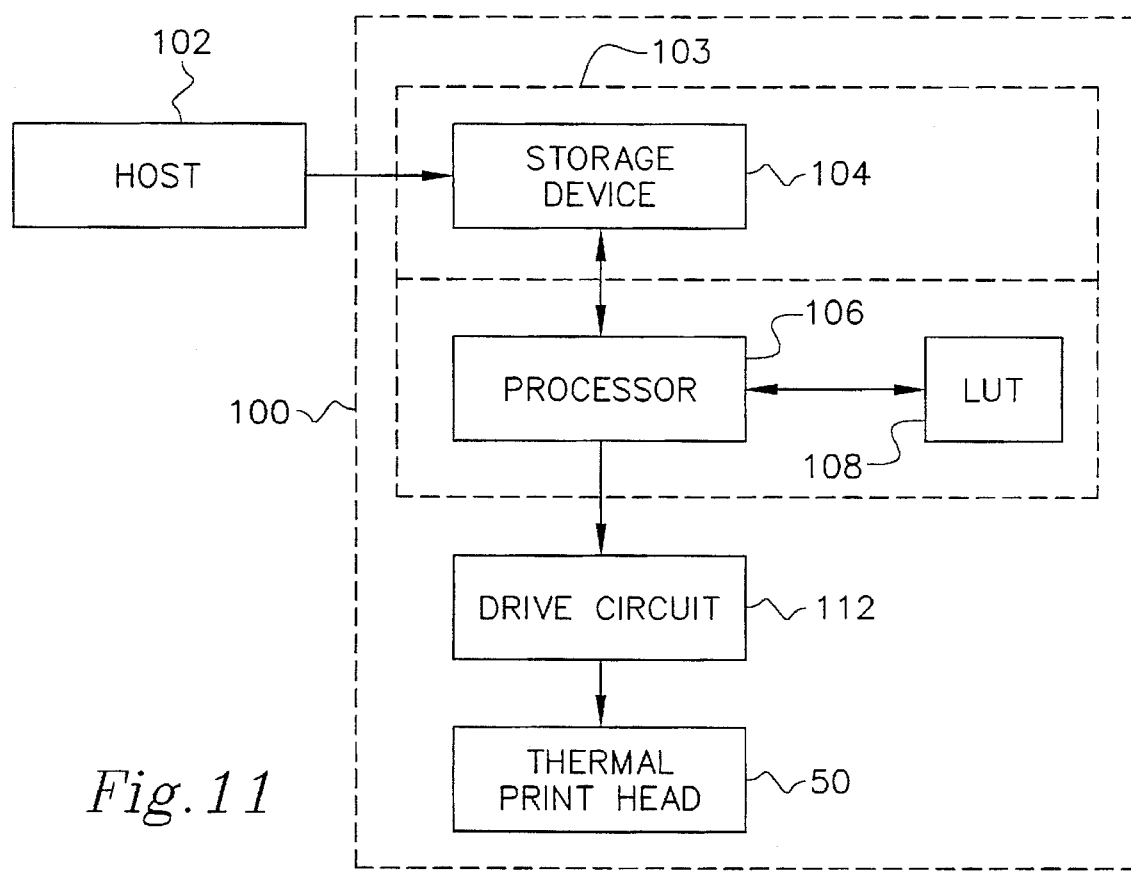
FIG. 11 schematically shows the apparatus of the present invention for controlling a thermal print head to selectively position active area boundaries.

FIG. 11 represents the apparatus that is used with the method of the present invention for controlling a thermal head to provide improved output. As discussed with regard to FIGS. 8–10, this improved output results from an ability to form active areas that can be extended or enlarged selected amounts, and thereby form a binary image that more closely conforms to the source image.

One aspect of the present invention is a thermal printing device 100 that receives source image information from a host 102. The thermal printing device 100 includes a print head controller 103 which includes a storage device 104, a processor 106 and a look-up table 108. The printing device 100 further includes a print head drive circuit 112 and a thermal print head 50 for providing images on print media.

The host 102 is a computer or processor having one or more software applications executing thereon for generating source image information. Alternatively, the host 102 can be a conventional imaging device such as a video camera or scanner. Image information from the host 102 is transferred to the thermal printing device 100 for display.

The image information from host 102 can be supplied in a number of different forms, such as a bitmap or a standard page description language. Upon receiving the source image information, the printing device 100 generates a coverage map of a source image that is stored in storage device 104. The coverage map rendering of the source image represents information as to positioning of active and inactive area within the output image. This coverage map can be in numerous different formats such a multiple bit binary number representing the amount of active area within each grid square associated with the output image. Alternatively, the coverage map may be a bit map or an array of binary values indicating which corresponding portions of the output image are active and inactive. Coverage maps that are in a bit map format can be in a variety of resolutions depending on the size of the corresponding portion of the output image associated with each binary value in the array.

The printing device 100 can include an interpreter (not shown) for converting the source image into the coverage map which is stored in storage device 104. Interpreters for converting source image information to a coverage map are known. Alternatively, the coverage information may be provided directly by the host 102 in a processor usable form, in which case the storage device 104 may be omitted.

An important aspect of the present invention is the method and apparatus by which the print controller 103 utilizes the coverage information stored in storage device 104. The print controller 103 utilizes the coverage information to generate drive energies or drive levels for each heating element in the thermal print head 116. These drive levels are provided to the print head drive circuit 112. The print head drive circuit 112 converts these drive levels to drive voltage pulses that are applied to each of the heating elements. The print head 50 as discussed previously converts the drive pulses into thermal distributions which interact with print media either directly or indirectly to form images.

The storage device 104 can be any conventional digital storage device, such as a magnetic storage device or a semiconductor storage device just to name two. In one preferred embodiment the storage device 104 is a rotating magnetic media storage device such as a disc storage device which receives coverage information over a network, described in co-pending U.S. patent application Ser. No. 08/270,046 entitled "METHOD AND APPARATUS FOR PRINTING A DOCUMENT OVER A NETWORK" filed Jul. 1, 1994 and assigned to assignee of the present invention.

In one preferred embodiment the processor 106 is a programmable processor such as a microprocessor which runs under software control. Alternatively, processor 106 can be implemented in any conventional hardware implementation such as logic devices, programmable logic devices or controllers, gate arrays or some form of custom integrated circuit. The look-up table 108 can be any conventional storage device such as magnetic or semiconductor storage devices. In one preferred embodiment the look-up table 108 is dynamic RAM (DRAM). Although FIG. 11 shows the print controller 103, drive circuit 112 and thermal print head 50 as separate functional blocks one or more of these functional blocks can be physically located together. For example, the drive circuit 112 or the print controller 103 can be physically mounted to the print head 50.

Figure 12:
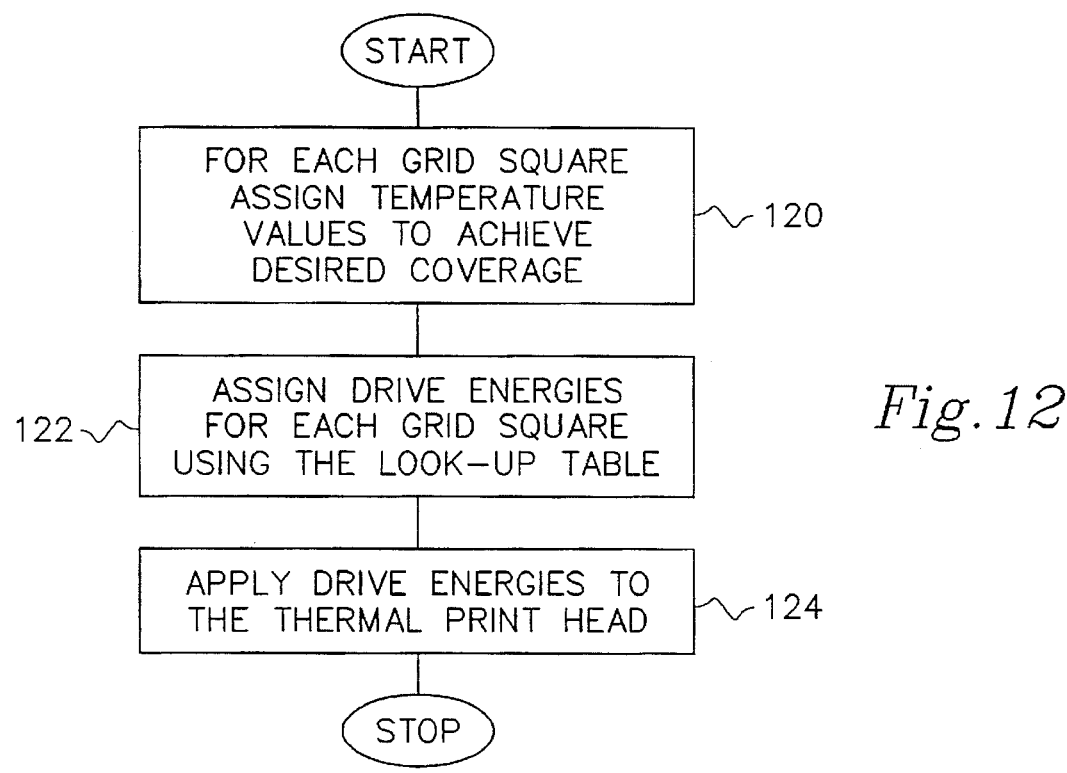
FIG. 12 schematically shows the method of the present invention for controlling the thermal print head for selectively positioning active area boundaries.

FIG. 12 shows the method of the present invention for converting the coverage map in storage device 104 into drive levels for energization of the thermal print head 50. As represented by step 120, temperature values are assigned to each grid square that correspond to the coverage information from the host. The assigned temperature values form a temperature map to provide active areas that correspond to the coverage map.

As represented by step 122, drive energies or drive levels are assigned to each grid square based on the temperature map formed in step 120. The assignment of drive energies accounts for the magnitude of drive energies applied to surrounding heating elements. In this way, the thermal distributions produced by these surrounding heating elements are taken into account. In one preferred embodiment, the adjacent heating elements as well as heating elements adjacent the adjacent heating elements are considered in assigning drive levels.

It is generally a difficult problem to calculate drive energies which will combine with the heat produced by adjacent heating elements to arrive at a desired media temperature. Therefore, the present invention makes use of a look up table 108 to determine drive energies. In one preferred embodiment, drive levels are provided by the look-up table based on the temperatures of the grid square as well as the four closest neighboring grid squares. In this preferred embodiment each of the grid square temperatures are 8 bit values representing temperatures between 0° and 115° C. above ambient. Therefore, all possible combinations of these five 8 bit temperatures requires a look-up table of $2^{40}$ entries. In order to reduce the size of this look-up table the preferred embodiment approximates the grid square temperatures with varying degrees of precision. In this preferred embodiment the most significant 6 bits of the 8 bit grid square temperature, the most significant 4 bits from the adjacent 8 bit grid square values, and the most significant 3 bits of the next closest pair of 8 bit grid square temperature values are used to select a drive level from the look-up table 108. Approximating grid square temperature values reduces the look-up table to $2^{20}$ different combinations of temperature values that are used to select a corresponding drive level. The use of a look-up table 108 in the present invention allows these thermal contributions to be taken into account rapidly with only a modest increase in hardware.

The method step 122 of FIG. 12 for assigning drive energies for each grid square temperature value utilizes the above described look-up table 108. The method step 122 takes into consideration not only the magnitude of the temperature which the four closest heating elements will reach but also the proximity of each of these heating elements to the selected heating element. The look-up table 108 could be expanded to include temperatures of more than 4 neighboring heating elements. However, the contribution of heating elements further than the 4 closest provide a small effect on the selected thermal distribution and therefore can be ignored.

One method for generating data in the look up table 108 is to utilize a mathematical model of the thermal properties of the thermal head 50. Techniques for modeling thermal print heads are known. See, e.g., "Design of Thermal Print Head or High Speed and High Resolution Printing" by S. Shibata and T. Kanamori published in Electronics and Communications in Japan, Part II, Volume 75, No. 6, 1992. Simpler thermal models may also be utilized to speed up calculations. Since such a thermal model calculates peak temperatures as a function of drive levels, an iterative technique may be used to calculate the set of drive levels required to achieve a given set of peak temperatures.

As shown in FIGS. 11 and 12, step 120 is preferably performed by the processor 106, and step 122 is preferably performed by the processor 106 in conjunction with look-up table 108. Upon completion of step 122, the assigned drive energies may be stored in a buffer for use by drive circuit 112.

As represented by step 124, the assigned drive energies are then converted into drive pulses and applied to the thermal print head 50 by the print head drive circuit 112. The print head drive circuit 112 may also include a resistance compensation means. Because it is now important to tightly control the amount of heat generated by each heating element, any differences in the resistance of heating elements are detrimental. The resistance compensation means adjusts the drive energies applied based on the particular resistance of each heater element, thereby generating the thermal distribution desired. The resistance compensation means is described in co-pending patent application entitled "HEATING CONTROL FOR THERMAL PRINTERS" filed herewith and assigned to assignee of the present invention incorporated herein by reference.

Drive energies are provided to the heating elements 56 to form a line of active areas on the print media. The print media is moved relative to the thermal head 50, and a next set of drive energies is applied to the thermal elements 56 to generate the next line of print. In this manner, a binary image is formed by incremental stepping or moving the print media relative to the print head 50.

In between each application of drive energies, some time may be provided to allow the system to cool. For example, when applying drive energies having a maximum duration of 4 or 5 milliseconds, heat may be allowed to dissipate for 9 or 10 milliseconds prior to the next heating cycle. With this cooling cycle, latent heat from a previous heating cycle is negligible, and no compensation for the previous heating cycle is necessary. This simplification of the thermal cycling allows for simpler computation and less costly controller requirements.

It should be recognized that the media need not actually be stopped during each heating cycle, and that a "step size" as used herein is not limited to incremental movement. Rather, the media may be moved continuously. For either incremental movement or continuous movement, the "step size" is equivalent to the distance the media travels in a complete heating/cooling cycle. Because the time when media coloring occurs is relatively short compared to the time of a complete heating/cooling cycle, and because the step size may be relatively small compared to the absolute resolution in the y-direction, continuous media movement should not greatly affect the quality of the output image.

To improve the effective resolution in the y-direction, the print media may be stepped at smaller increments than the absolute resolution of the thermal print head. For example, stepping the 600 dpi print head 50 four times for each pixel or dot provides an effective resolution of 2400 lines per inch in the y-direction. It is noted, however, that the minimum feature size or absolute resolution is limited to the physical features of the print head 50 and is therefore 1/600th of an inch.

Figure 13:
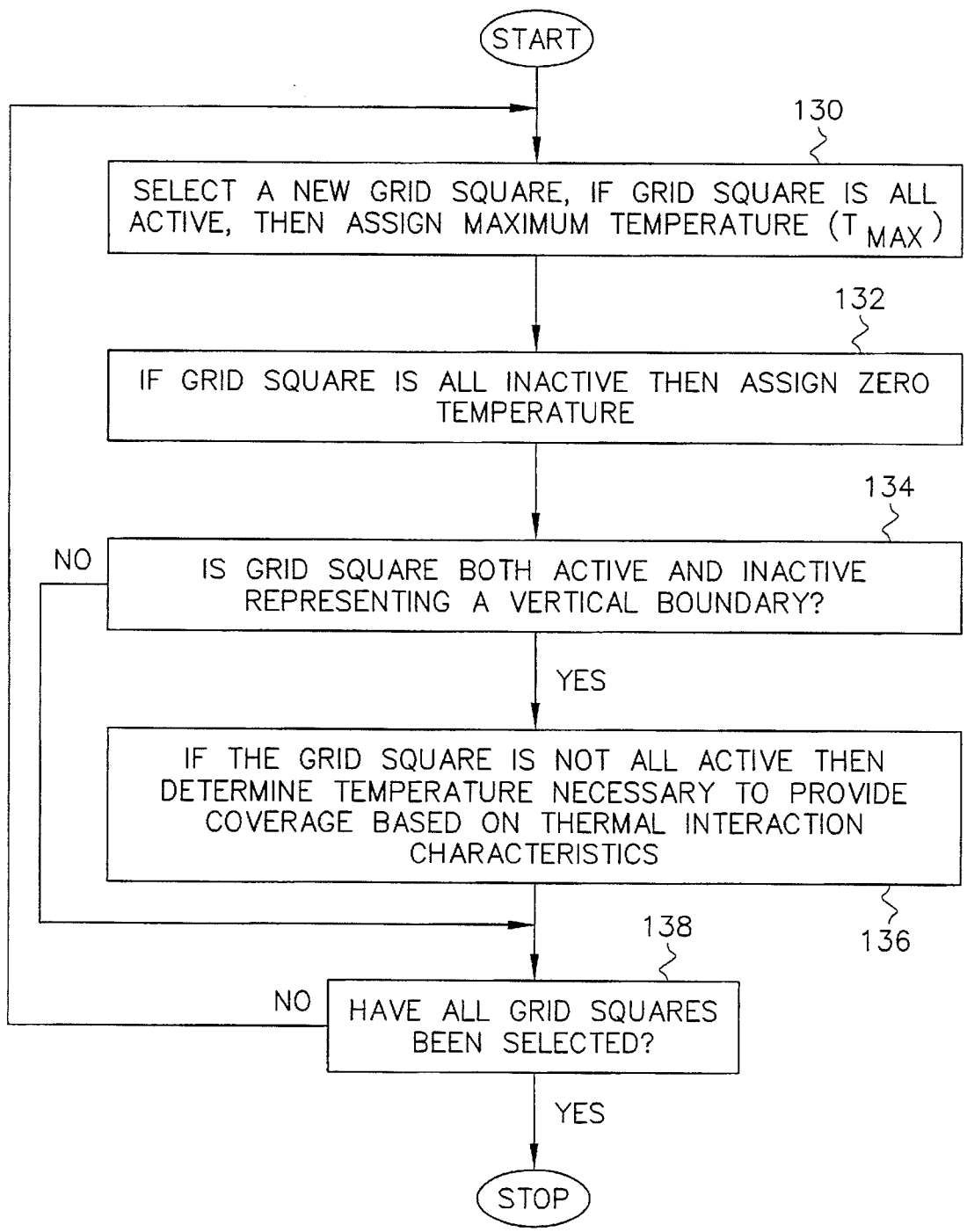
FIG. 13 schematically shows the method of the present invention for assigning temperature values for each grid square in the frame buffer.

FIG. 13 shows the method of the present invention for generating a temperature map. A coverage value is selected from storage device 104 as shown in step 130. If the coverage value indicates that the pixel is 100% active, a temperature is assigned to this grid square to provide 100% coverage. The temperature is selected to form a sufficiently large active area to cover the entire grid-square 33 without damaging the thermally sensitive print media.

If the coverage value indicates that the grid square is 100% inactive, a temperature of 0 is assigned to this grid square coverage as represented by step 132. In the preferred embodiment, a four bit coverage value, a value of 1111 (binary) or 15 (decimal) indicates that the grid square is 100% active, and a value of 0000 (binary) or 0 (decimal) indicates that the grid square is 0% active.

As shown in step 134, if the coverage value indicates that the corresponding grid square is both active and inactive (i.e., a value between 0000 and 1111 (binary) or between 0 and 15 (decimal)), then a boundary condition is present. A boundary condition simply represents that a boundary or edge between active and inactive area is present within the corresponding output gridsquare. A boundary condition temperature is determined based on the mount of grid square coverage and thermal interaction characteristics of the thermal head 50 as shown in FIGS. 8, 9 and 10.

If all the coverage values in storage device 104 have not been selected then the process is continued until all of these values have been selected as represented by step 138.

Implicit in the method of the present invention is that each edge or boundary grid square will be adjacent an active grid square. Therefore, temperatures of the boundary grid square are assigned that will extend the boundary from the active grid square to provide proper coverage of the boundary grid square. The only time a boundary grid square will not be adjacent and active grid square is when a feature is present in the source image that is smaller than two grid squares. This condition can be handled separately or simply ignored.

Shown in FIGS. 14–16 is an example of the mappings used by the present invention in printing from the ideal circular source image 15 of FIG. 3. FIG. 14 represents the coverage map of this source image 15 in storage device 104. Each of the coverage values shown in FIG. 14 are decimal values ranging from 0 to 15, representing each of the possible values of the corresponding 4 bit binary value that is stored in storage device 104. The data is shown separated into squares 150, corresponding to grid squares 33 of imaginary grid 24 in FIGS. 1–3. Four values are shown within each square 150, representing coverage values for four vertical portions of each grid-square 33.

Outputs similar to those shown in FIGS. 1 and 2 may be generated from the data of FIG. 14 through simple thresholding. For example, each square 150 having an average value of 7 or more may activate a heating element. For the higher effective y-resolution output 36 of FIG. 2, a heating element may be activated for each coverage value over 7. The data for FIGS. 1 and 2 may further be modified so as to produce symmetrical output images 12 and 36.

FIG. 15 represents the temperature map generated from the coverage map data of FIG. 14. The maximum temperature is equal to 114, the standard temperature is equal to 84 and the minimum temperature is equal to 0. It can be seen that the maximum temperature is generally adjacent to each of the active area boundaries, and the inner temperatures have generally been reduced to the standard temperature of 84. The vertical edges or boundaries between active and inactive areas have temperatures assigned to selectively extend the boundary from the adjacent heating element. It should be recognized that the present invention can be utilized with numerous modifications to this temperature map.

FIG. 16 represents the drive map or drive levels that are applied to the thermal head 50 to print the output image 42 of FIG. 3. The drive levels are selected using the look-up table 108, taking into the account not only the desired temperature from the corresponding location in FIG. 15, but also the temperature from the 4 neighboring squares 152 in FIG. 15. In this manner, a drive level is selected to provide a thermal distribution which when combined with the 4 neighboring distributions will produce the desired media temperature. The output image 42 of FIG. 3 is formed by applying the drive levels shown in FIG. 16 to thermal head 50.

FIGS. 14–16 show mappings used in a particular preferred embodiment to properly generate drive levels for the individual heating elements. While the mapping are shown to illustrate the general method followed, the data shown is dependent upon the particular techniques used. Workers skilled in the art will appreciate that various other methods and techniques can be used to convert the source information into drive levels, any of which may utilize the present invention to control active area boundaries.

It should further be recognized that the present method can theoretically allow infinite effective resolution. The effective resolution will now not be constrained by the print head. Rather effective resolution may now be constrained by either the stepping size, by discrete levels of available drive energies, by the desired printing rate, or by the memory size of the printer. Printing in accordance with the present invention allows placement of boundaries at selected locations along a continuum, with the selected locations being determined by these other constraints.

Figure 17:
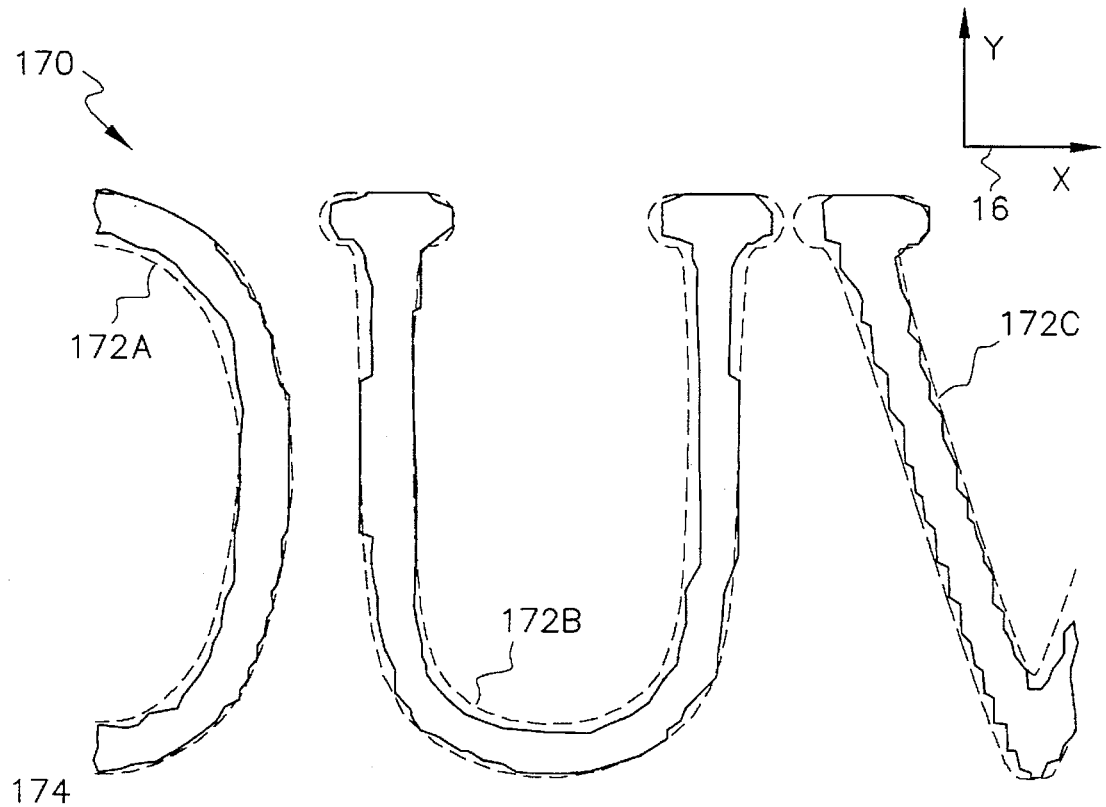
FIG. 17 shows printed characters without selectively adjusting active area boundaries.
Figure 18:
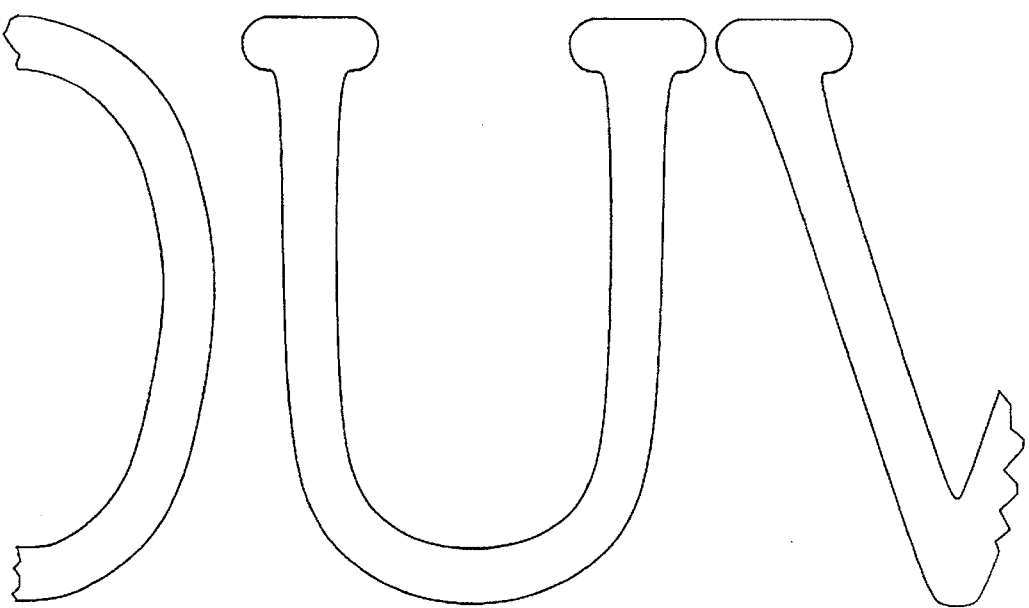
FIG. 18 shows the printed characters with adjustment of active area boundaries in accordance with the present invention.

FIGS. 17 and 18 provide a dramatic illustration of the improvement in text images utilizing the technique of the present invention. FIG. 17 shows an output image 170 traced from photographs taken utilizing magnification of text characters "0", "U" and "V" rendered using a thermal printer having a resolution of 600 dpi in the horizontal or x-direction and 2,400 dpi in the vertical or y-direction. The x and y directions are indicated by directional reference 16. Characters "0" and "V" are shown partially broken away. The dotted lines 172a, 172b, 172c, represent ideal source image outlines for text characters "0", "U" and "V", respectively. Each of these characters suffer from aliasing errors as a result of the limited resolution in the horizontal or x-direction. In contrast, FIG. 18 shows an output image 174 traced from photographs taken utilizing a magnification of the same text characters of FIG. 17 that is formed using the previously described technique of the present invention for selectively extending active area boundaries in the x-direction for improving the resolution and visual acuity of the output image. It can be seen that the text characters of FIG. 18 are clear and crisp and do not suffer from the jaggies resulting from limited resolution in the x or horizontal direction as do the text characters of FIG. 16.

FIGS. 19–24 represent the method of the present invention for controlling the position of the boundary between active and inactive areas of the binary image. FIG. 19 is a representation of drive voltages applied to adjacent heating elements 56a and 56b during one heating cycle. Drive pulse 180 provided to heating element 56a commences at time $t_1$ and ends at time $t_5$. Drive pulse 182 provided to "neighbor" heating element 56b commences at time $t_3$ and ends at time $t_5$. FIG. 19 thus represents the duration as well as relative timing of drive pulses 74 and 78. Heating element 56c is not driven.

FIGS. 20–24 are x-dimension representations of temperature distributions resulting in the media from application of drive energy to adjacent heating elements 56a and 56b, at various points in time. FIG. 20 is taken at $t_0$, FIG. 21 is taken at 12, FIG. 22 is taken at $t_4$, FIG. 23 is taken at $t_5$, and FIG. 24 is taken at $t_6$. In each of these FIGS. 20–24, curve 184 represents the temperature resulting in the media solely from drive pulse 180. Curve 186 represents the temperature resulting in the media solely from drive pulse 182. Curve 188 represents the aggregate temperature that results in the media from the interaction of heat from heating elements 56a and 56b. Each of these curves 184, 186, 188 are mapped in the x-direction, and the x-orientations of heating elements 56a, 56b, 56c are shown.

As indicated by FIG. 20, the media temperature at time $t_0$ is ambient temperature, with negligible residual heat from the previous heating cycle. The media temperature remains at ambient temperature through time $t_1$, as neither heating element 56a nor 56b has been energized.

Heating element 56a is energized at time $t_1$, and immediately thereafter begins transmitting heat to the media. As indicated in FIG. 21, by time $t_2$ the media is heated about heating element 56a to just begin crossing the threshold temperature 190 and begin coloring. As shown by curve 186 in FIG. 21, heating element 56b has not yet been energized at time $t_2$, and thus curve 186 remains at ambient temperature. Heating elements 56b and 56c remain unenergized through time $t_3$, and through time $t_3$, curve 188 grows with curve 184 due solely to heat from heating element 56a.

By time $t_4$ of FIG. 22, heating element 56b is providing some portion of the heat for aggregate curve 188. The combined heat from heating elements 56a and 56b have caused the dot made by heating element 56a to grow toward heating element 56b. This asymmetrical dot growth is evidenced by the distance 192 between curve 188 and curve 184 as they cross threshold temperature 190. However, curve 186 has not yet reached the threshold temperature 190 to independently cause coloring of the media.

Time $t_5$ of FIG. 23 represents the maximum heat output of both heating elements 56a and 56b during the heating cycle. Heating element 56c, being outside the desired active area, remains unenergized. The asymmetrical dot growth is substantially complete, and distance 194 shows the growth achieved by heater element 56b in combination with heater element 56a. Note that the coloring represented by distance 194 would not occur by either heating element 56a or heating element 56b independently, and only occurs due to the thermal interaction between the two heating elements 56a, 56b.

Time $t_6$ of FIG. 24 shows the cooling of the system that has occurred, and can be used with a stepping of the media as time $t_0$ in a subsequent heating cycle.

While FIGS. 20–24 show temperature curves in the x-direction only, it should be understood that printing occurs in a more complex, three dimensional, time varying world. FIGS. 20–24 represent temperatures at a y-location centered on print head 50 and at a z-location on the media surface. Corresponding temperature curves could be generated for different y- and z-locations, which would be related to the temperature curves shown through heat transfer in the y- and z-directions.

FIG. 25 represents the thermal distributions corresponding to the drive pulses shown in FIG. 19. Thermal distribution 184a represents the maximum temperature, over time, resulting in the media solely from drive pulse 180. Thermal distribution 186a represents the maximum temperature, over time, resulting in the media solely from drive pulse 182. Thermal distribution 188a represents the aggregate thermal distribution that results from the interaction of heat from heating elements 56a and 56b. The portion of thermal distribution 188a which exceeds threshold temperature 190 colors the media. It will be understood that, by extending thermal distribution 188a shown in FIG. 25 in the x and y-direction shown by directional reference 16, the total area for which thermal distribution 188a exceeds the threshold temperature plane can be projected as the binary image on print media by the printer.

These FIGS. 19–25 represent a theoretical underpinning of what is believed to occur by using the present invention, and are not based on any testing or data. It is recognized that this theoretical underpinning may later be altered or modified for a more complete understanding of the phenomenon occurring to color the media. In particular, the threshold temperature may not be accurate as modeled. Color transfer is, at least in some systems, related to the amount of heat and the duration energy is applied, and thus may not be accurately modeled by a mere threshold temperature. Color transfer may further occur across a temperature band rather than at a single temperature. Such a threshold temperature band is encountered to produce a phase change of wax-based donor media, wherein the non-homogeneous molecular structure requires a range of temperatures for melting.

FIG. 26 shows an area of an image 195 created by four applications of the drive pulses 180, 182 shown in FIG. 19. Each application of the drive pulses 180, 182 has produced a dot 196. In between these four applications, the media 14 has been stepped a linear distance 32, which is roughly the same as the pitch 28. The image 196 is divided into imaginary pixel grid-squares 33. The size of these grid-squares 33 is roughly equivalent to the size of a dot formed by one printing element on the printer, and accordingly represents the absolute resolution of the printer. The media 14D can be stepped at other smaller linear distances 32 to increase the effective resolution in the y-direction for the output image portion 195.

Coloration of printing media can be readily observed, and thus the coloration shown in FIG. 26 is known to occur in response to the drive pulses shown in FIG. 19, regardless of any theoretical underpinning. Active area 196, having boundary 198, has been colored by heat from heating elements 56a and 56b. Boundary 200, shown in a dashed line, represents the boundary of a standard sized active area (such as active area 72 in FIG. 6) that would have occurred solely from pulse 180. As can be seen in FIG. 26, the right edge of each boundary 198 has been effectively extended a distance d due to the drive energy 182 applied to neighbor heating element 56b.

Each of the dots printed can be thought of as having an "aspect ratio", defined as the ratio between the greatest x-dimension of the dot and the greatest y-dimension of the dot. Energizing a single heating element produces a symmetrical dot having a set initial aspect ratio, which, if the dot is squarish or circular (i.e., rather than rectangular), has an aspect ratio of 1:1. Prior art printers have desired that all dots printed have the same aspect ratio. Rather than the symmetrical dots desired by prior art printers, dots 196 created by the present invention are egg-shaped and have a combined aspect ratio which is significantly different from the initial aspect ratio. The amount of "neighbor" growth, or the combined aspect ratio of the dot created by both heating elements 56a and 56b, can be selectively adjusted by controlling the voltages, durations and/or timing of pulses 180, 182. The application of larger drive energies to adjacent heater element 56b can be used to further extend the right edge of each boundary 198 a distance greater than d, creating dots of higher aspect ratios. Conversely, a smaller drive energy applied to adjacent heater element 56b can be used to extend the right edge of each boundary 198 a smaller distance d from boundary 200, creating dots of lower aspect ratios. The selection of drive energy to heating element 56a can be further used to selectively control the combined aspect ratios, thereby selectively positioning the right edge of boundary 198.

By controlling a series of neighbor growths, the exact location of the boundary for output image portion 195 can be selectively adjusted right or left within the neighbor grid-square column 202. Similarly, the exact location of the right edge of boundary 198 can be selectively adjusted for each media advance, and thus output image portion can curve or angle within the neighbor grid-square column 202 as desired. The pulses applied to neighboring heating elements 56a, 56b thus allow effective resolution in the x-direction which is significantly greater or finer than the absolute resolution in the x-direction.

An important aspect of the present invention is that the timing of the drive pulses applied to adjacent heating elements 56a and 56b may be selected to provide the most beneficial resultant distribution 188a. It is believed that the thermal distributions 184 and 186 have their greatest areal extent at or near the end of the pulse. At the end of the pulse, the heat created by pulse is fully generated in a heating element 56b, and has not had enough time to greatly dissipate.

Neighboring drive pulses which begin at the same time are "left justified" or "start justified". It is believed, for step-function, equal voltage drives, that start justified drive pulses create individual thermal distributions which grow simultaneously and equivalently. It is desired that neighbor drive pulse be turned off prior to having its thermal distribution cross the threshold temperature, so as to not independently create a dot at the neighbor grid-square. Accordingly, start justified drive pulse to neighbor heating element 56b would be mined off significantly before the heat created by heating element 56a was maximized, and thus not be as effective in creating aggregate thermal distribution 188a.

In the preferred embodiment, both drive pulses 180 and 182 end or have falling edges at time $t_5$. Drive pulses 180 and 182 are "right justified" or "end justified" because both of these pulses, regardless of when they commence, end at the same time $t_5$. To avoid having thermal distribution 188a cross the threshold temperature 190 and thereby not independently create a dot at heating element 56b, the commencing of drive pulse 182 is delayed from the commencing of drive pulse 180. Because it is the aggregate distribution 188a which controls the coloring of the media, it is believed that end justifying the pulses 108, 182 provides the maximum interaction between thermal distributions 184 and 186. End justifying provides stability as well as consistency and predictability in the positioning of the boundaries 198.

It is believed that alternative timing of drive pulse applications can be used to control characteristics of the resultant thermal distribution 188a. In addition to the start justified and end justified timings discussed, respective drive pulses 180, 182 could be timed at an offset, such that either pulse begins first, such that either pulse ends first, such that either or both pulses are pulse width modulated, etc.

In particular, it may be beneficial to delay the neighbor pulse 182 such that it ends slightly after pulse 180 ends, thus providing additional time for thermal distribution 184 to migrate away from heating element 56a. This type of timing may further be necessary if damage temperatures are being reached by aggregate thermal distribution 188a with end justifying. It may even be desired to delay the start of one pulse until after the other pulse ends. It is believed that the aggregate thermal distribution for this over-delay would be similar to a wave, and the maximum temperature would be reached at different times at different x-locations. In any event, it is important to recognize that it is the aggregate distribution 188a which controls coloring of the media, and that pulses 180, 182 may be selected so as to each contribute to the desired aggregate distribution 188a.

In order that the boundary 198 that is formed by the resultant distribution 188a be well defined, it is believed that the resultant distribution 188a should have a high "threshold gradient" 204. Threshold gradient 204 is represented in FIG. 26 by a triangle having the same slope as thermal distribution 188a at threshold temperature 190. The resultant distribution 188a should be decreasing significantly as it crosses the threshold temperature 190 to create a high threshold gradient 204. As shown in FIG. 26, it is believed that the thermal distribution 188a has a higher threshold gradient at its left edge than at its right edge.

It is believed that a high threshold gradient 204 produces a distinct boundary 198 between an active area and an inactive area. Conversely, a low threshold gradient 204 can cause either a boundary 198 of varying shades or an inconsistent location for boundary 198. If the combined thermal distribution 188a is not decreasing at a sufficient gradient 204, the imaging threshold 190 may not be crossed at a definite, predictable location. The threshold gradient 204 necessary to form a well defined boundary 198 will, in general, be dependent on the optical density characteristics or change in optical density with respect to temperature for the media 14.

It is believed that, in general, end justifying provides a maximum threshold gradient 204. The maximum threshold gradient 204 is also dependent on the magnitude of thermal distribution 184 provided to the primary heating element 56a. To ensure that the threshold gradient 204 for the resultant thermal distribution 188a is high, the gradient from thermal distribution 184a should dominate. Therefore, the thermal distribution 184a should have a relatively large magnitude and form a relatively large energy distribution so that a relatively large threshold gradient 204 results in the combined thermal distribution 188a.

The slope of threshold gradient 204 is further dependent on the x-location of boundary 198. If the desired boundary 198 is less than 50% into the neighbor grid-square column 202, the gradient provided by thermal distribution 186a will tend to lower the threshold gradient 204 of overall thermal distribution 188a. If the desired boundary 198 is more than 50% into the neighbor grid-square column 202, the gradient provided by thermal distribution 186a will tend to increase the threshold gradient 204 of overall thermal distribution 188a. Once the exact x-location that is desired for boundary 198 is known, drive energies 180, 182 can be selected to maximize the threshold gradient 204 at that particular x-location. In general, numerous combinations of drive energies 180, 182 may exist to provide a sufficient threshold gradient 204.

Proper control of growth into the neighbor pixel is also dependent on the pitch 28 of the thermal print head 50. All other things being equal, a thermal distribution will extend further into the neighbor grid-square for thermal heads 50 having a smaller pitch 28. While the heat generation and heat transfer of the smaller pitch print head is presumed to be equal, the distance or spacing between heating elements is smaller. Because heat is dispersing in three dimensions, a small change in pitch 28 of the print head 50 can have a significant effect on the contributions provided by neighboring thermal distributions. The technique of the present invention is therefore better and more easily controlled on higher resolution thermal print heads 50.

Thermal print heads 50 that have larger pitch 28 may require that the heating elements 56a, 56b be energized over a longer period of time to allow a thermal interaction to occur between neighboring heating elements 56a, 56b. For example, a broader thermal distribution can be obtained by increasing the energization time and reducing the drive voltage. This increase in energization time causes greater opportunity for thermal interaction between heating elements so that the technique of the present invention can be used. Adjustments may further be needed for thermal print heads and/or media that have poor transfer of heat, particularly if heat transfer does not readily occur in the x-direction.

A further aspect of the present invention is that the voltage or magnitude of the drive pulses 180, 182 applied to adjacent heating elements 56 and 56a may be selected or modified to provide the most beneficial resultant distribution 188a. Drive pulses 180, 182 are both shown as step functions, each having a magnitude $V_1$. The step function is preferred for simplification of the processing requirements to control the heating elements, as the only variable is when the pulses start. It is not necessary that both voltages have this magnitude, or that both voltages have the same magnitude. It is further not necessary that either voltage be a step function. Drive voltages which vary over time may be found to create beneficial resultant distributions 188a, both in terms of neighbor growth and threshold gradients 204.

Thus far we have described the control of boundaries by selective energization of heating elements only in the x direction. However, it is possible to affect boundaries in the y direction as well as the x direction. Y direction effective resolution may be increased by selectively driving border heating elements at different drive energies, thereby forming different sized active areas. For example, effective resolution in the y-direction of 2400 dpi or higher may be achieved by stepping at 1200 steps per inch and growing dots in the y-direction into previous and subsequent grid squares. With proper adjustment of drive levels to adjust y direction boundaries, the step size 40 and the stepping rate may be increased, providing significantly higher print rates without loss of effective resolution.

It is further contemplated that the look-up table 108 in FIG. 11 could be used to compensate for residual heat from previous heating cycles. This residual heat results if the duration between heating cycles is sufficiently small that the residual heat from previous heating cycles no longer has an insignificant effect on the thermal distributions associated with the current heating cycle. This implementation requires an increase in the size of the lookup table 108 to account for residual heat in a manner similar to the method neighbor heat is accounted for as previously described.

Additionally, while the present invention is particularly contemplated for use with one dimensional heating elements arrays, it is appreciated that two dimensional heating arrays may be manufactured in the future which could utilize the present invention. Heating elements immediately above or below the primarily pixel location could be similarly driven below the threshold temperature to create identical neighbor effects in a two dimensional heating array. The increased number of heating elements in a two dimensional heating array would significantly increase the rate of printing. The rate of printing could be further increased not only because the time required for a cooling cycle could be reduced or eliminated, but also because it would not be necessary to step at increments less then the absolute resolution of the printer.

Additionally, while the present invention is contemplated for thermal printers, other types of printing may be devised for which interactive effects between neighboring printing elements allow enhanced effective resolution of the output image.

It is presently contemplated that the stepping increments used can be significantly smaller than a pixel in order to increase the effective y direction resolution. Stepping in smaller increments allows more choices to begin a y end of a character line and when to end the y boundary between the active and inactive layer as discussed in application Ser. No. 08/146,506.

The previous discussion deals with controlling the energy applied to adjacent heating elements for providing improved fidelity and visual acuity of the output image for text and line art source images. Applicant has recognized that his technique is well suited for accurately controlling the proportion of colored and non-colored areas in the formation of a halftone cell that is used in the rendering of continuous tone source images.

Continuous tone source images are made up of a series of regularly spaced samples ranging in tone from non-colored to colored through intermediate shades of color which can be rendered as a binary image utilizing various halftoning techniques. These halftoning techniques make use of the arrangement of binary picture elements or dots which provide the illusion of a continuous tone image. Some of these halftoning techniques are described in "Digital Halftoning" by R. Ulichney, MIT Press, Cambridge, Mass. (1987).

Often a halftone cell is utilized which represents an area in the output image or printed image. By selectively altering the proportion of active area to inactive area in this cell, the printed image when viewed at a distance can provide a perception of tone. Frequently, the halftone cell is comprised of a plurality of dots or areas which are selectively activated to provide increasing levels of tone. For example, a 4×4 halftone cell that is made up of 16 dots or areas is capable of representing 16 different levels of tone in the output image.

One method for increasing the number of tones that can be represented by a halftone cell of a given size is to reduce the step size in which the print media is moved relative to the print head. The reduction of step size is discussed previously with respect to increasing the y direction effective resolution. This reduction of step size effectively increases the number of tones or shades that can be represented by a given size halftone cell. This reduction of the step size allows the proportion of active area to inactive area within the halftone cell to be controlled in smaller increments between the range of 0% to 100% active. For example, a 4×4 halftone cell that is stepped four times per pixel is capable of representing 4×16 or 64 different levels of tone.

One aspect of the present invention is to control the energy applied to adjacent heating elements for selectively extending the active area along the x axis for controlling the proportion of active area within the halftone cell. By selectively extending the active area of an adjacent active area, the proportion of active area in the halftone cell can be formed at virtually any proportion between 0–100% depending on the control over the drive energy that is available. Furthermore, this method may be used in conjunction with decreasing the step size in which the media is moved past the print head shown in FIG. 2 as well as altering the drive energy applied to a single dot or area to alter the active area size in a symmetrical manner as shown in FIGS. 3 and 4.

Utilizing this technique for increasing the number of tones that are represented in the printed image as well as the technique for improving the fidelity and visual acuity of the output image for text and line art, Applicant has recognized that the thermal printing device is suited for certain applications that were previously not thought possible.

Another aspect of the present invention is to use the techniques previously described with respect to improving the resolution as well as visual acuity of text and line art images and the number of tones that can be represented in continuous tone images for performing color proofing. The color proofing process is a method for determining how the output image will look when printed on a printing press. The proofing process is an attempt to correct the output image before the expense of plate making and priming is incurred.

Printing presses that are used for large volume production typically require the making of an intermediate image carrier typically referred to as a plate which is used in conjunction with the printing press to form an output image. The image on the printing plate represents a single color in the output image formed by the printing press. Therefore, for a four color output image such as cyan, yellow, magenta, and black, four different plates are used to print each color, thereby forming a four color output image. Each of these colors in the output image typically have a certain relationship to each other such as an offset or screen angle so that these colors interact properly. One method for making these printing plates is to form an image representative of a single color contribution such as cyan, magenta, yellow and black on a transparent film. This film is then used in a photomechanical process to expose a light sensitive coating on the printing plate. The exposed areas of the coating become insoluble in water or other solutions. The unexposed area in contrast dissolve leaving the exposed portion as an image or stencil for use in the printing process.

An important aspect of the present invention is the use of application of controlled amounts of energy to adjacent heating elements for selectively extending active areas in the x direction for improving the horizontal resolution of text and line art images as well as improving the number of tones that can be represented between a 0% and a 100% tone for halftone images. These techniques of the present invention allow a more robust tonal quality as well as a higher fidelity and greater visual acuity in the output image which is suitable for imaging on film for use in a photomechanical process to make printing plates.

Another aspect of the present invention is the use of the technique for controlling energy applied to adjacent heating elements for both improving the fidelity or visual acuity of text and line art images, as well as improving the number of tones that can be rendered. This technique makes it possible for indirect imaging of individual color images on transparent film sometimes referred to as color separations or "progressives". These color separations in one preferred embodiment are formed using a thermal wax transfer process. These color separations are used to preview individual colors for defects before print making and can be overlayed on top of each other to allow a preview of how the final printed image may look on the press.

Although the present invention has been described with reference to preferred embodiments, workers skilled in the art will recognize that changes may be made in form and detail without departing from the spirit and scope of the invention.

What is claimed is:

1. A process of thermal printing on media, the process comprising the steps of:

energizing a first heating element of a plurality of heating elements with a first drive pulse of a magnitude sufficient to independently produce an active area on the media; and energizing a second heating element adjacent to the first heating element with a second drive pulse, the second drive pulse being of a magnitude insufficient to independently produce an active area on the medium wherein the magnitude of said first drive pulse and the magnitude of said second drive pulse are determined with reference to a least four neighboring heating elements of the first and second heating element, respectively.

2. The process of claim 1 wherein the first and second drive pulses have different starting times.

3. The process of claim 2 wherein the first and second drive pulses are end-justified.

4. The process of claim 1 wherein the first and second drive pulses have different ending times.

5. The process of claim 1 wherein the first and second drive pulses are electrical voltages.

6. The process of claim 5 wherein the first and second drive pulses have different voltage magnitudes.

7. The process of claim 1 wherein the first and second drive pulses overlap at least partially in time.

8. The process of claim 1 wherein the media is thermosensitive.

9. The process of claim 1 wherein the media receives coloring from thermally sensitive donor media.

10. The process of claim 1 further comprising the steps of:
allowing heat to substantially dissipate from the first and second heating elements; and continuously moving the media without pause relative to the heating elements.

11. The process of claim 1 further comprising the step of incrementally stepping the media relative to the heating elements.

12. The process of claim 11, wherein the steps of energizing the first heating element, energizing the second heating element and incrementally stepping the media are repeated until an image has been printed on the media.

13. The process of claim 12, wherein the media is stepped incrementally relative to the heating elements at individual increments smaller than the distance between the adjacent heating elements.

14. A process of thermal printing on media, the process comprising the steps of:

energizing a first heating element of a plurality of heating elements with a first drive pulse sufficient to independently produce an active area on the media; and energizing a second heating element adjacent to the first heating element with a second drive pulse to extend a boundary of the active area, the first drive pulse and the second drive pulse being non-identical;

and wherein each said first and second drive pulse are derived with reference to a least four neighboring heating elements of the first and second heating element, respectively.

15. The process of claim 14 wherein the first and second drive pulses are non-identical by having different starting times, and wherein the first and second drive pulses are substantially end-justified.

16. The process of claim 14 wherein the first and second drive pulses are non-identical by having different voltage magnitudes, and wherein the first and second drive pulses are substantially end-justified.

17. The process of claim 14 wherein the second drive pulse is insufficient to independently produce an active area on the medium.

18. The process of claim 14 wherein the energizing of the second heating element selectively extends the location of the boundary along a continuum.

19. The process of claim 14 further comprising the step of:

determining a desired extent of the boundary from source data; and generating the first and second drive pulses corresponding to the desired extent of the boundary.

* * * * *